United States Patent [19]
Ichikawa et al.

[11] Patent Number: 5,684,830
[45] Date of Patent: Nov. 4, 1997

[54] NOISE REMOVING DEVICE AND DATA COMMUNICATION APPARATUS USING THE SAME

[75] Inventors: Yuji Ichikawa, Tenri; Katsuya Nakagawa, Nara; Akira Imai, Nara; Hiroshi Uno, Nara, all of Japan

[73] Assignee: Sharp Kabushiki Kaisha, Osaka, Japan

[21] Appl. No.: 326,277

[22] Filed: Oct. 20, 1994

[30] Foreign Application Priority Data

Feb. 10, 1994 [JP] Japan ..................... 6-016886
Sep. 7, 1994 [JP] Japan ..................... 6-213961

[51] Int. Cl.$^6$ ............................ H04B 1/10; H04B 14/04
[52] U.S. Cl. .................. 375/254; 375/285; 375/350; 455/296
[58] Field of Search .................... 375/254, 285, 375/326, 346, 350; 359/325; 455/63, 295, 296, 303

[56] References Cited

U.S. PATENT DOCUMENTS

| | | | |
|---|---|---|---|
| 4,679,090 | 7/1987 | Erhardt | 358/213.26 |
| 5,218,448 | 6/1993 | Honjo et al. | 358/328 |
| 5,280,347 | 1/1994 | Shiraishi et al. | 358/14 |

FOREIGN PATENT DOCUMENTS

| | | |
|---|---|---|
| 63-78641 | 4/1988 | Japan . |
| 4-330838 | 11/1992 | Japan . |

OTHER PUBLICATIONS

*HPSIR*, "Serial Infrared Communications Specification," Jul. 21, 1994, pp. 1–9.

*HPSIR*, "Serial Infrared Communications Hardware Design Guide," Jul. 21, 1994, pp. 1–7.

*Primary Examiner*—Stephen Chin
*Assistant Examiner*—Don Jo
*Attorney, Agent, or Firm*—David G. Conlin; Brian L. Michaelis

[57] ABSTRACT

The noise removing device is used in a data communication system utilizing a transmitting signal modulated by a data signal to be transmitted. The noise removing device includes a receiving section for receiving the transmitting signal, and converting it into an electric signal, so as to supply an input signal, an analog signal processing circuit for selectively passing the input signal in a first frequency range including a carrier frequency of the transmitting signal, thereby removing a first noise, for converting the passed signal into a digital signal, and for outputting the digital signal, and a digital signal processing circuit for sampling the digital signal, and for selectively passing the digital signal in a second frequency range including the carrier frequency based on a result of comparison of a pattern obtained by the sampling with a predetermined pattern, thereby removing a second noise.

49 Claims, 33 Drawing Sheets

Transmission data 51

Modulated signal 52

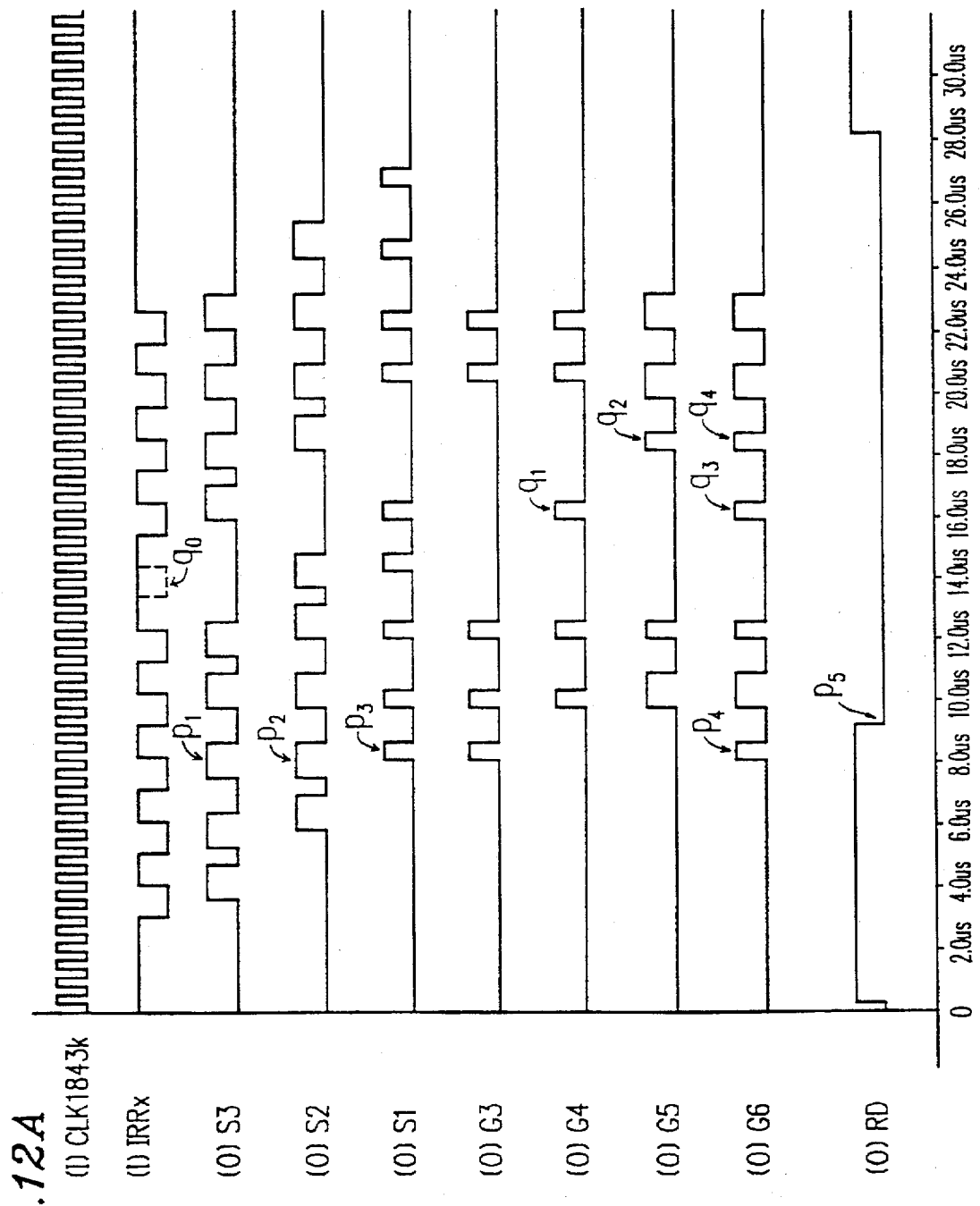

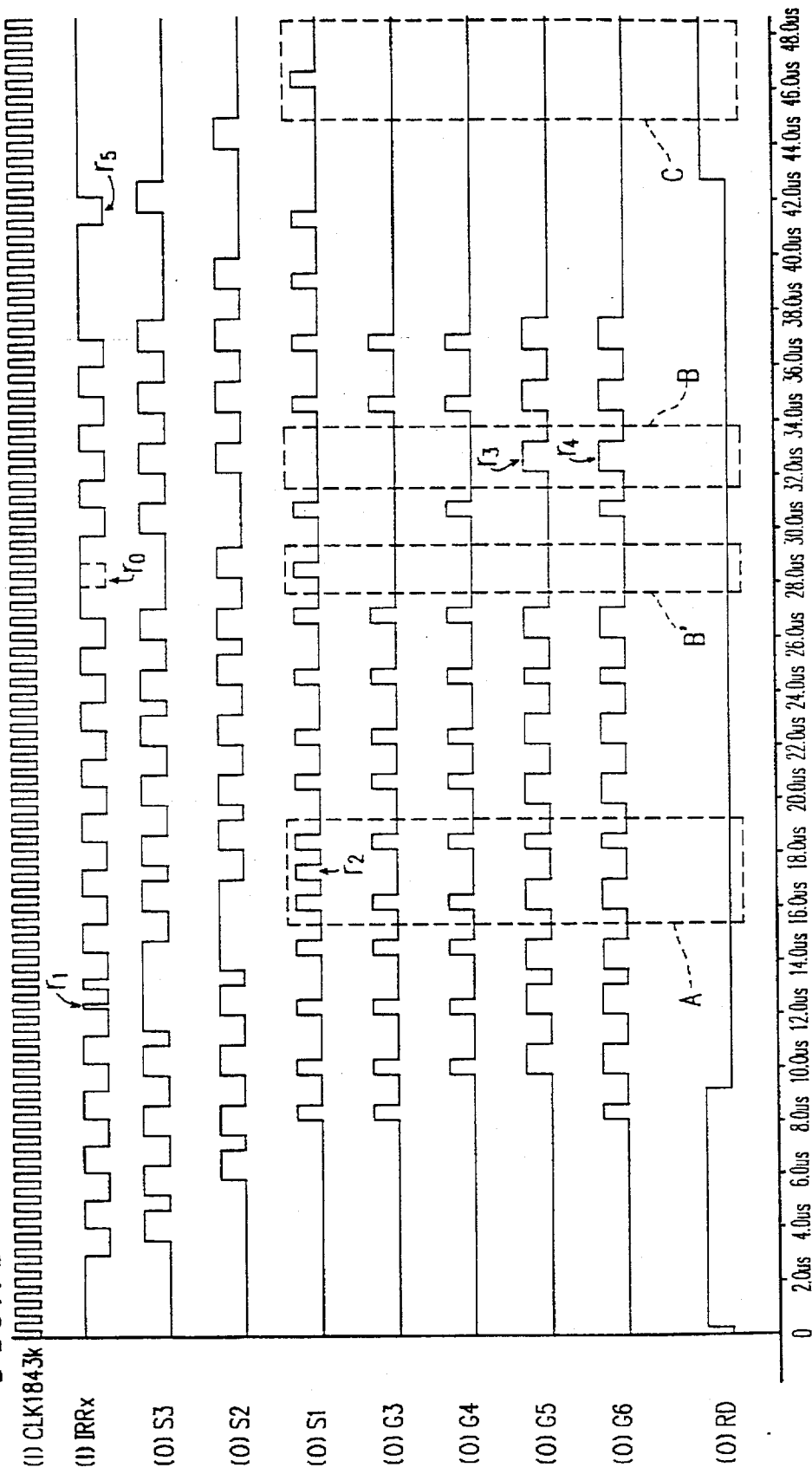

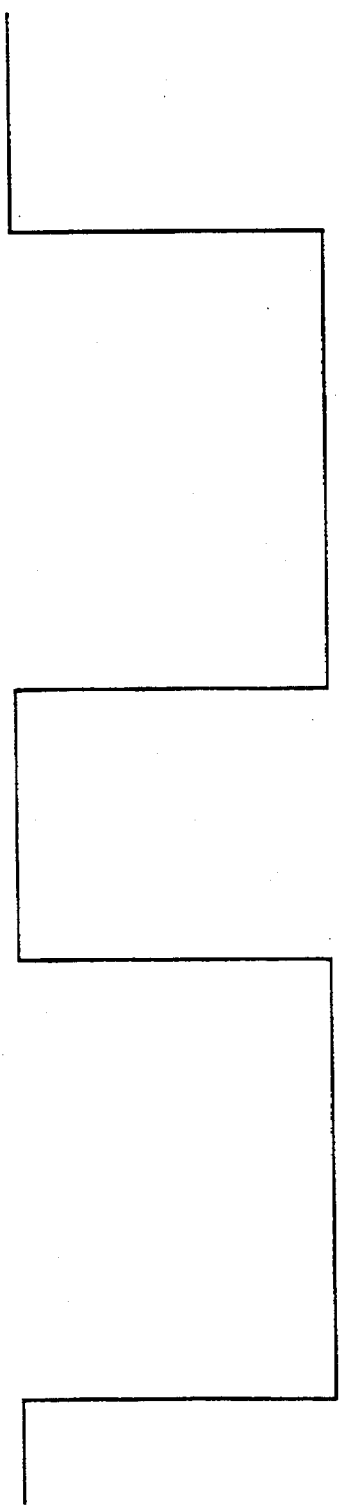
FIG.15A  Transmission data 151
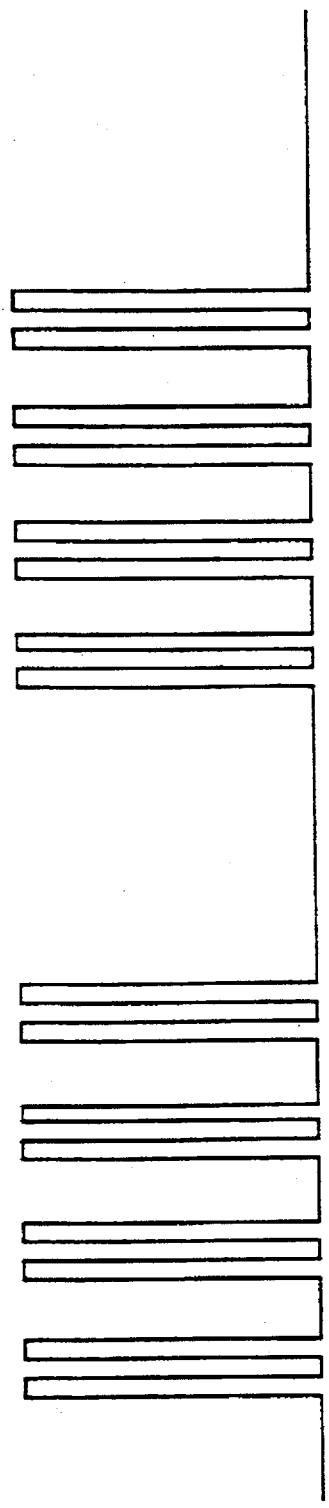
FIG.15B  Modulated signal 152

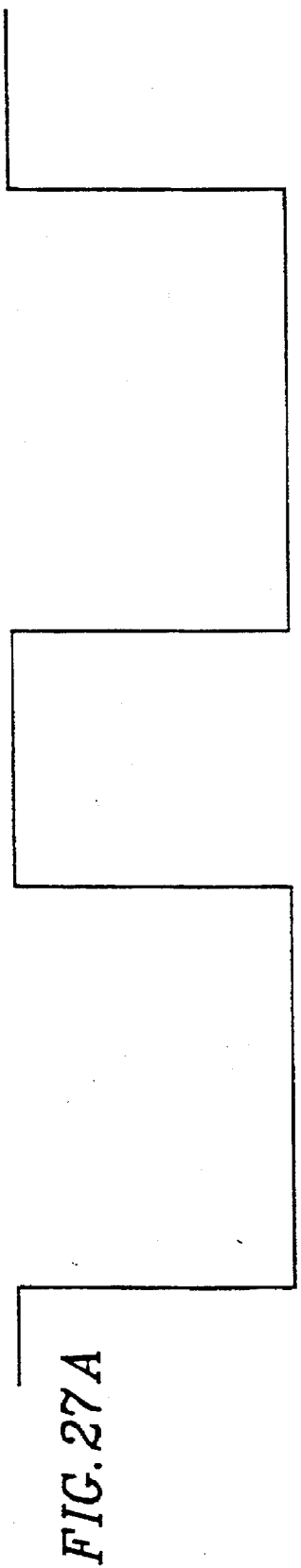
FIG.27A Transmission data 51
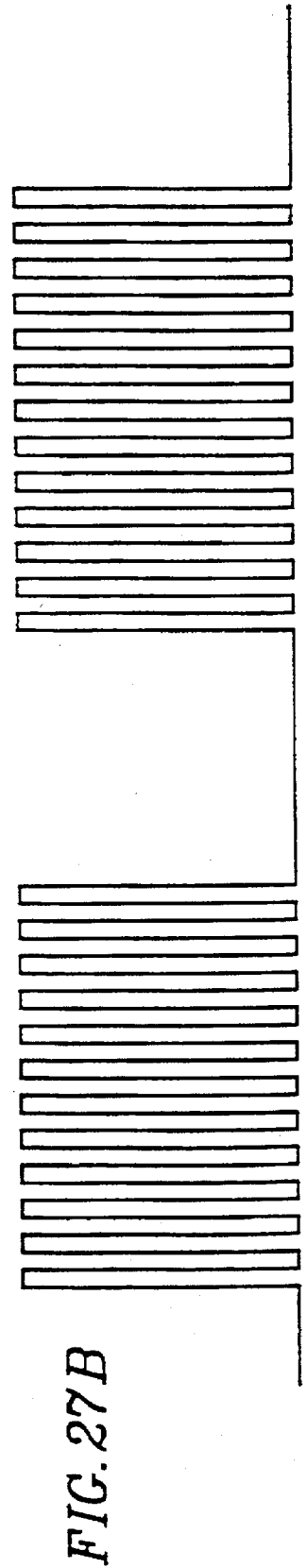
FIG.27B Modulated signal 52

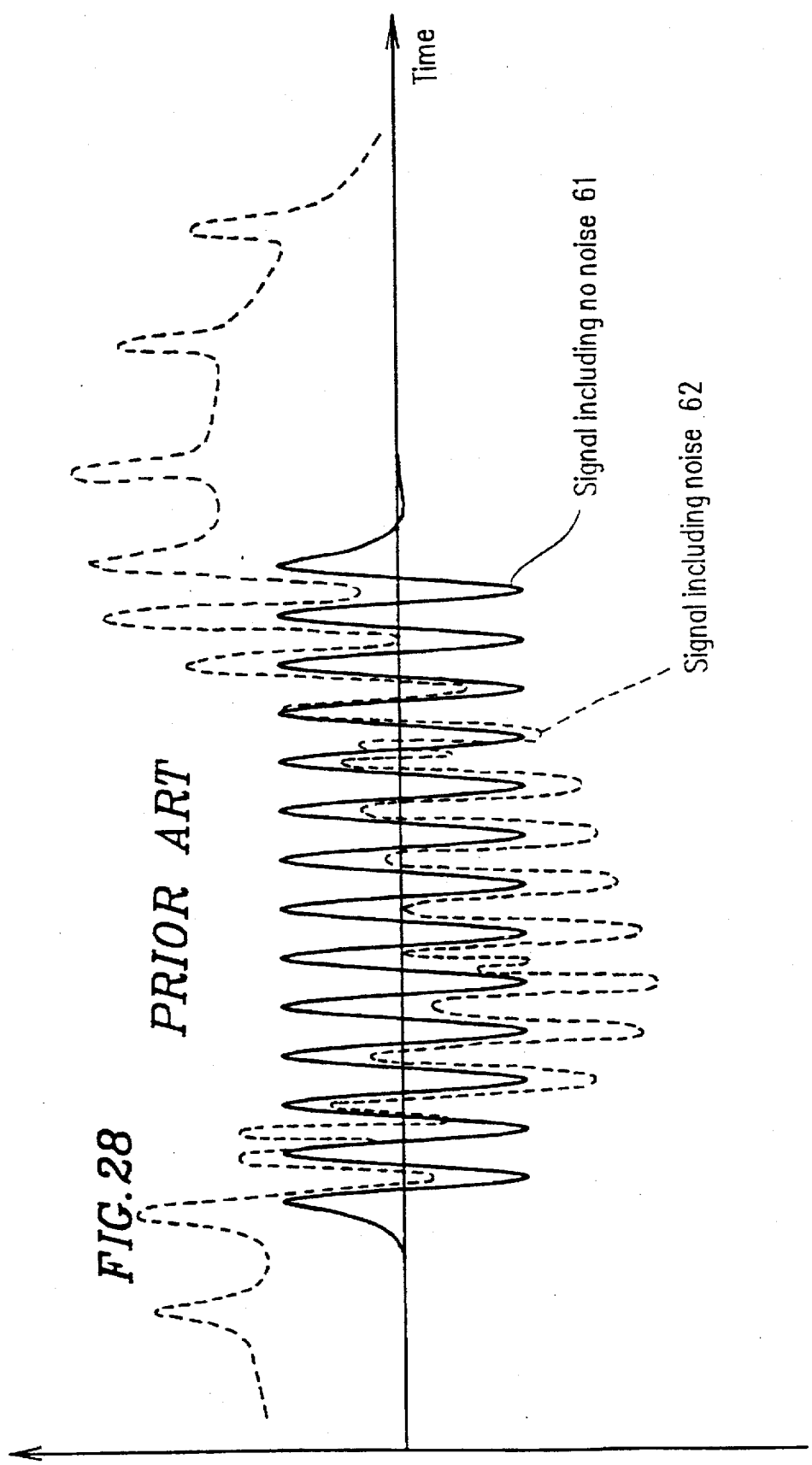

Transmission data 451

FIG.32A
PRIOR ART

Modulated signal 452

FIG.32B
PRIOR ART

Pulse width = 3/16 of bit time

NOISE REMOVING DEVICE AND DATA COMMUNICATION APPARATUS USING THE SAME

BACKGROUND OF THE INVENTION

1. Field of the Invention

The present invention relates to a noise removing device and a data communication apparatus using the device in wireless data communication. More particularly, the present invention relates to a receiver provided with a noise removing device.

2. Description of the Related Art

In recent years, personal data assistant (PDA) or portable information equipment represented by portable electronic equipment such as so-called electronic organizers are increasingly in demand due to their significant feature of portability.

As the communication technique is developed, the availability of conventional information equipment is also enhanced by performing a distributed processing. In distributed processing, data or programs are transmitted among a plurality of information devices, and the data processing is performed. Especially, the distributed processing is greatly demanded in an open system in which information devices with various different venders can be connected to each other. Conventional personal computers and workstations are generally connected via a local area network (LAN) such as "Ethernet".

In the data communication system over LAN, various information equipments and terminal devices are connected via communication lines such as coaxial cables and optical fibers, so that they exhibit poor applicability to portable information equipments. If the portable information equipment should be connected with a cable every time it is connected to a piece of peripheral equipment, the portability and the mobility are lost. This means that the most significant feature, i.e., "portability" of the portable information equipment is disadvantageously limited. Accordingly, in order to allow the portable information equipment to participate with an open system as its element, communication with a wireless connection is required.

As described above, the portable information devices are necessarily required to have a wireless communication function, in order to best attain its effects. As a medium for wireless communication, an infrared ray is often used for various reasons such as the following. First, it can easily realize the compactness in size and the lightness in weight of the information device. Secondly, the device consumes low power for communication. Thirdly, it can be used anywhere because it is not legally restricted, for example, by the Radio Law. Fourthly, the data security can be easily held by the propagation characteristics of the infrared ray (e.g., it does not propagate through walls, and it has strong directivity).

The infrared communication system has various advantages suitable for portable information equipment as described above. However, in the environment in which the portable information equipment is used, there exist various noise sources such as an incandescent lamp and a fluorescent lamp which generate noises against the infrared communication. Especially, inverter fluorescent lamps which are currently widely sold emit infrared rays over a wide range of the frequency, so that it is necessary to provide infrared communication having a strong immunity against external noises.

FIG. 25 is a block diagram schematically showing an example of information equipment having a wireless communication function. The conventional information equipment 200 includes a main circuit 210 which carries a versatile IC (integrated circuit) such as a CPU (central processing unit), a peripheral circuit 220 such as a display device and an input device, a transmitter 230, a receiver 240, and an ASIC (Application Specific Integrated Circuit) 250. The ASIC 250 is dedicated for controlling the peripheral circuit 220, the transmitter 230, and the receiver 240.

FIG. 26 shows an example of the conventional receiver 240. As the receiver 240, for example, an infrared communication unit RY5AR01 (produced by SHARP Corp.) is used. The receiver 240 is, for example, installed on portable information equipment such as an electronic organizer. The receiver 240 is an infrared communication unit in ASK (Amplitude Shift Keying) system using a carrier of 500 kHz, and is constructed of analog circuits.

FIGS. 27A and 27B show signal waveforms of a transmission data signal and a carrier (sideband) in the case where the ASK modulation scheme at 500 kHz is used. During a period in which the transmission data 51 shown in FIG. 27A is at a low level, an oscillating wave of 500 kHz is output. During a period in which the transmission data 51 is at a high level, the oscillating wave is not output and the output signal is held at a fixed level. FIG. 27B shows the waveform of a modulated signal (transmitting signal) 52 which is obtained by modulating a carrier based on the transmission data 51. The above-mentioned information equipment 200 performs its infrared communication in the ASK system using a carrier of 500 kHz. The information equipment 200 transmits data by turning on or off an infrared LED (light emitting diode: not shown) provided in the transmitter 230 using the modulated signal 52 shown in FIG. 27B.

In the data communication between the portable information equipment 200 and another piece of information equipment (e.g., another portable information equipment 200), the transmitter 240 receives an infrared signal transmitted from another transmitter (e.g., 230) and demodulates the received signal.

The receiver 240 includes a pin photodiode 241 functioning as a photodetector, an amplifier 242 for amplifying the output signal from the pin photodiode 241, a band-pass filter 243 for filtering the signal from the amplifier 242, and a detector circuit 244 for extracting the transmitted information (transmission data) from the output signal from the band-pass filter 243. The conventional receiver 240 also includes an adjusting circuit (not shown) for adjusting various parameters of analog circuits.

The pin photodiode 241 receives the infrared signal modulated in accordance with the ASK system, and converts the received signal into an electric signal. FIG. 28 shows exemplary waveforms of signals output from the pin photodiode 241 when the pin photodiode 241 receives the ASK-modulated signal of 500 kHz. Signal 61 shows the signal waveform which is output when the pin photodiode 241 receives a modulated signal including a noise, e.g., when a noise source generating infrared rays over a wide frequency band such as a fluorescent light or the like exists near the pin photodiode 241.

The amplifier 242 amplifies the output signal of the pin photodiode 241. The band-pass filter 243 has a frequency characteristic corresponding to the frequency band of the ASK carrier, and the band-pass filter 243 removes noises having frequencies which are not included in the frequency band of the ASK carrier from the electric signal amplified by the amplifier 242. The detector 244 demodulates the signal by figuring an envelope waveform from the signal which are output by the band-pass filter 243. The output of the detector 244 is converted from an analog signal into a digital signal by a comparator 245.

As described above, by removing the noises having frequencies which are not included in the frequency band of the ASK carrier by the band-pass filter 243, the communication can be performed even when there exist noises over a wide frequency band including the carrier frequency.

The conventional receiver 200 is constituted of only analog circuits. Another receiver which includes digital circuits as well as the analog circuits is proposed. FIG. 29 schematically shows such a conventional receiver 300. The receiver 300 includes an analog circuit section 340 and a digital circuit section 350. A signal amplified in the analog circuit section 340 is input into the digital circuit section 350 where the signal is demodulated. The demodulated signal is output from the receiver 300. Such a receiver 300 is, for example, shown in the pamphlets (the distributed materials) of the "HPSIR Serial Infrared Communications Hardware Design Guide" and the "HPSIR Serial Infrared Communications Hardware Specification" of the Serial Infrared Communications equipment by the Hewlett-Packard Company.

The analog circuit section 340 of the receiver 300 includes a pin photodiode section 341, an amplifier section 342, and a comparator section 343. The specific circuitry of the analog circuit section 340 is shown in FIG. 30. The digital circuit section 350 includes an edge detecting section 352 which receives a signal from the analog circuit section 340, a counter section 353 which receives an external clock signal UART CLK, an edge detection activating section 354, and a demodulation section 355. The specific circuitry of the digital circuit section 350 is shown in FIG. 31.

The waveform of a data signal used in the conventional receiver 300 and the corresponding modulated signal waveform are shown in FIGS. 32A and 32B, respectively. In the receiver 300, the modulated signal (transmitting signal) 452 is a pulse signal composed of a series of pulses generated at the falling edges of the transmission data signal 451. The receiver 300 receives the digital modulated signal 452 and demodulates the signal.

FIG. 33 shows a typical data word transmission used for digital signal communication by the receiver 300. Each data stream consists of 8-bit words with optional parity. Each word is sent serially beginning with a zero value start bit and ending with at least one stop bit with a binary value of one. A zero is signaled (infrared signal) by sending a signal pulse at the beginning of the serial bit time. A one is signaled by sending nothing at all. The width of each pulse is 3/16ths of a signal bit time. In this way, each word will begin with a pulse for the start bit.

The receiver 300 can change the data communication rate by varying the clock signal UART CLK shown in FIG. 31. Specifically, it is possible for the receiver 300 to adapt itself for data communication rates in the range of 300 bps (baud/sec) to 115.2 kbps. Since the transmission system adopted in the receiver 300 is a base-band system, the analog circuit section 340 shown in FIG. 30 has a band-pass filter characteristic adaptable for the range from 300 bps to 115.2 kbps.

The analog circuit section 340 receives the modulated signal 452 and outputs a signal which is obtained by inverting the low/high level of the signal 452. The digital circuit section 350 receives the signal output from the analog circuit section 340 and the edge detecting section 352 detects the pulse. When the edge detecting section 352 detects the pulse, the demodulating section 355 outputs a low signal, so as to activate the counter section 353. The counter section 353 sets up the edge detecting section 352 via an edge detection activating section 354, after a time corresponding to ½ bit (½ bit time) from the time of receiving the pulse. The counter section 353 returns the level of the output from the demodulating section 355 to high after one bit time from the time of receiving the pulse. As the result of the above-mentioned operation, the modulated signal 452 is received and demodulated.

However, a noise removing device using analog circuits such as the conventional receiver 240 involves the following drawbacks.

(1) In the receiver in a data communication system adopting a modulation/demodulation method using a carrier, such as an ASK system, noises of the frequencies excluding the signal frequency band are removed by filtering the received signal with a band-pass filter which is set in the carrier band. Accordingly, in order to effectively remove the noises, the band-pass filter is required to have a sufficiently steep filter characteristic. In order to constitute the band-pass filter having a steep characteristic by using analog circuits, it is necessary to use passive elements such as resistors and capacitors, as well as active elements such as operational amplifiers and transistors. For example, the receiver 240 includes 100 transistors. Even if the comparator 245 is excluded, the receiver 240 still includes about 90 transistors.

As described above, since the band-pass filter 243 having a steep filter characteristic is constituted of analog circuits in the conventional receiver 240, the circuit scale of the conventional receiver 240 is increased and the mounting area of the device is increased. Accordingly, in order that such a receiver may become an available product, it is necessary to make the analog circuits into an IC circuit having a practical size.

(2) When the analog circuits are made into an IC circuit, the precision of device characteristics are deteriorated as compared with discrete device components. As to the discrete device components, the variation in the device characteristics is 10% or less, but the variation of analog IC characteristics is 30%–40%. Therefore, it is necessary to provide an additional circuit for adjusting the characteristics in addition to the analog IC itself. As a result, the mounting area cannot be reduced although the analog circuits are integrated into an IC. Moreover, during mass production, it is necessary to perform the adjusting operation for characteristics for every lot of the produced analog ICs, so that the number of production processes as a unit is increased and hence the production cost is increased.

(3) Furthermore, as to the conventional receiver 240 using analog circuits, the characteristics of the band-pass filter and the construction of the detector circuit which are set during the production thereof cannot be changed when the receiver is in practical use. Accordingly, the carrier used in the data communication cannot be changed, so that the adaptability is poor.

The conventional receiver 300 shown in FIG. 29 includes no special noise removing device. In addition, the receiver 300 is designed so that the data communication rate can be varied. Accordingly, the filter characteristic of the analog circuit section 340 is not steep for allowing the receiver 300 to accommodate various communication rates. Therefore, if there exist noise signals which are stronger than the transmission signal, the communication cannot be properly performed.

On the other hand, the method for demodulating a transmitted signal modulated by an ASK system using a digital circuit is disclosed in Japanese Laid-Open Patent Publication No. 4-330838 (a demodulation circuit in the ASK modulation scheme) and in Japanese Laid-Open Patent Publication No. 63-78641 (a signal judging circuit).

The demodulation circuit disclosed in Japanese Laid-Open Patent Publication No. 4-330838 uses a digital circuit for the purpose of correcting the variation of carrier frequency without using a reference clock. Therefore, the demodulation circuit may erroneously count the pulse generated by a noise having a frequency component which is closer to the carrier frequency. Thus, the demodulation circuit has a disadvantage in that it is difficult to remove the noises in the vicinity of the carrier frequency.

The signal judging device disclosed in Japanese Laid-Open Patent Publication No. 63-78641 uses a digital circuit for performing an envelope detection. The demodulation circuit may erroneously count the pulses generated by noises having frequencies equal to or higher than the carrier frequency band. Thus, the signal judging device has a disadvantage in that it is difficult to remove such noises.

SUMMARY OF THE INVENTION

The noise removing device of this invention is used in a data communication system which uses a transmitting signal modulated by a data signal to be transmitted. The noise removing device includes: receiving means for receiving the transmitting signal, and converting it into an electric signal, so as to supply an input signal; analog signal processing means for selectively passing the input signal in a first frequency range including a carrier frequency of the transmitting signal, thereby removing a first noise, for converting the passed signal into a digital signal, and for outputting the digital signal; and digital signal processing means for sampling the digital signal, and for selectively passing the digital signal in a second frequency range including the carrier frequency based on a result of comparison of a pattern obtained by the sampling with a predetermined pattern, thereby removing a second noise.

According to another aspect of the invention, a receiver in a data communication system which uses a transmitting signal modulated by a data signal to be transmitted is provided. The receiver includes: receiving means for receiving the transmitting signal, and converting it into an electric signal, so as to supply an input signal; analog signal processing means for selectively passing the input signal of a first frequency range including a carrier frequency of the transmitting signal, thereby removing a first noise, for converting the passed signal into a digital signal, and for outputting the digital signal; digital signal processing means for sampling the digital signal, and for selectively passing the digital signal in a second frequency range including the carrier frequency based on a result of comparison of a pattern obtained by the sampling with a predetermined pattern, thereby removing a second noise; and means for demodulating the data signal from the output signal of the digital signal processing means.

In one embodiment of the invention, the receiver further includes second analog signal processing means for, when the transmitting signal is a signal which is transmitted by a base-band transmission method, receiving the input signal and for amplifying the output signal so as to output a second digital signal, and second digital signal processing means for receiving the second digital signal and for decoding the second digital signal, thereby demodulating the transmitted signal.

In another embodiment of the invention, the receiver further includes means for selectively outputting one of the output of the demodulating means and the output of the second digital signal processing means, based on whether the transmitted signal is a carrier signal modulated by the data signal or a base-band transmission signal of the data signal.

In another embodiment of the invention, the receiver further includes means for selectively inputting the second digital signal into the second digital signal processing means by controlling the second digital signal output from the second analog signal processing means in accordance with the output signal of the first digital signal processing means. The selectively inputting means may suppress the input of the second digital signal into the second digital signal processing means, when the input signal is a carrier signal modulated by the data signal.

In one embodiment of the invention, the analog signal processing means includes first filter means for selectively passing the input signal in the first frequency range and analog/digital converting means for converting the input signal passed through the first filter means into a digital signal, so as to output it, and wherein the digital signal processing means includes sampling means for sampling the digital signal output from the analog/digital converting means, comparing means for comparing the sampling pattern obtained by the sampling with the predetermined pattern, and second filter means for selectively passing the digital signal in the second frequency range based on the comparison result.

In another embodiment of the invention, the digital signal processing means includes edge detecting means for detecting an edge of the digital signal output from the analog/digital converting means and for generating a detection signal, and the sampling means performs the sampling based on the detection signal.

In another embodiment of the invention, the first frequency range excludes a frequency range lower than a predetermined frequency, and the second frequency range excludes a frequency range higher than another predetermined frequency.

In another embodiment of the invention, the predetermined pattern is a waveform pattern of the carrier.

In another embodiment of the invention, the data signal to be transmitted is a digital signal.

In another embodiment of the invention, the transmitting signal is a signal obtained by modulating the carrier by an ASK method.

In another embodiment of the invention, the data communication system is a wireless communication system.

In another embodiment of the invention, a communication media of the data communication system is an infrared ray.

In another embodiment of the invention, the data signal to be transmitted is a digital signal, the transmitting signal is a signal obtained by modulating the carrier by an ASK method, and the data communication system is a wireless communication system using an infrared ray.

According to another aspect of the invention, a noise removing method in a data communication system which uses a transmitting signal modulated by a data signal to be transmitted is provided. The noise removing method includes: a step of selectively passing an input signal in a first frequency range including a carrier frequency of the transmitting signal by processing the input signal through an analog signal processing, thereby removing a first noise; and a step of selectively passing the input signal in a second frequency range including the carrier frequency based on a result of comparison of a pattern obtained by sampling the input signal with a predetermined pattern, thereby removing a second noise.

According to another aspect of the invention, a noise removing method in a data communication system which uses a transmitting signal modulated by a data signal to be transmitted is provided. The noise removing method includes the steps of: receiving the transmitting signal, and converting it into an electric signal, so as to generate an input signal; selectively passing the input signal in a first frequency range including a carrier frequency of the transmitting signal by processing the input signal through an analog signal processing, thereby removing a first noise; converting the input signal which is selectively passed into a digital signal; sampling the digital signal; comparing the pattern obtained by the sampling with a predetermined pattern; and selectively passing the digital signal in a second frequency range including the carrier frequency based on the comparison result, thereby removing a second noise.

In one embodiment of the invention, the noise removing method further includes a step of generating a detection signal by detecting an edge of the digital signal, wherein in the sampling step, the digital signal is sampled based on the detection signal.

In another embodiment of the invention, the first frequency range excludes a frequency range lower than a predetermined frequency, and the second frequency range excludes a frequency range higher than another predetermined frequency.

In another embodiment of the invention, in the comparing step, the pattern obtained by the sampling is compared with a waveform pattern of the carrier.

In another embodiment of the invention, the data signal to be transmitted is a digital signal.

In another embodiment of the invention, the transmitting signal is a signal obtained by modulating the carrier by an ASK method.

In another embodiment of the invention, the data communication system is a wireless communication system.

In another embodiment of the invention, a communication media of the data communication system is an infrared ray.

In another embodiment of the invention, the data signal to be transmitted is a digital signal, the transmitting signal is a signal obtained by modulating the carrier by an ASK method, and the data communication system is a wireless communication system using an infrared ray.

According to another aspect of the invention, a receiving method in a data communication system which uses a transmitting signal modulated by a data signal to be transmitted is provided. The receiving method includes the steps of: receiving the transmitting signal, and converting it into an electric signal, so as to generate an input signal; selectively passing the input signal in a first frequency range including a carrier frequency of the transmitting signal, thereby removing a first noise; converting the input signal which is selectively passed into a digital signal; sampling the digital signal; comparing a pattern obtained by the sampling with a predetermined pattern; selectively passing the digital signal in a second frequency range including the carrier frequency based on the comparison result, thereby removing a second noise; and demodulating the digital signal from which the first and second noises are removed so as to obtain the data signal.

In one embodiment of the invention, the receiving method further includes the steps of: when the transmitting signal is a signal which is transmitted by a base-band transmission method, amplifying the input signal through an analog signal processing, thereby generating a second digital signal; and decoding the second digital signal through a digital signal processing, thereby demodulating the transmitting signal.

In another embodiment of the invention, the receiving method further includes a step of selecting one of the signal from which the first and second noises are removed and the signal obtained by decoding the second digital signal, based on whether the transmitted signal is a carrier signal modulated by the data signal or a base-band transmission signal of the data signal.

In another embodiment of the invention, the receiving method further includes a step of selecting one of the step of removing the first noise and the step of generating the second digital signal, based on whether the transmitted signal is a carrier signal modulated by the data signal or a base-band transmission signal of the data signal.

In another embodiment of the invention, the receiving method further includes a step of suppressing the step of decoding the second digital signal in accordance with a value of the data signal demodulated in the demodulating step.

In another embodiment of the invention, in the suppressing step, the step of decoding the second digital signal is suppressed when the transmitted signal is a carrier signal modulated by the data signal.

In the noise removing device, the receiver section converts the received carrier signal into an electric signal, and supplies the input signal to the analog signal processing section. The analog signal processing section functions as a high-pass filter. The analog signal processing section removes noises in low frequency ranges from the input signal, and converts the signal into a digital signal which is then output. The digital signal processing section samples the digital signal after the high-pass filtering, and compares the resultant pattern with a waveform pattern of the carrier frequency. The digital signal processing section outputs a digital signal based on the compared result (specifically, when the pattern obtained by the sampling is matched with the frequency pattern of the carrier with a prescribed precision). In this way, the digital signal processing section functions as a low-pass filter and removes noises in high frequency ranges.

By complementarily using the analog signal processing section and the digital signal processing section so as to implement a band-pass filter having a sufficiently steep characteristic, the noises having frequencies outside of the carrier frequency band are removed.

The receiver obtains the transmitted data signal by modulating the digital signal which is obtained by removing the noises as described above.

When the received signal is not the modulated signal but instead the signal transmitted in the base-band transmission system, the input signal is amplified by the second analog signal processing section which is the same as the conventional one. The amplified signal is converted into a digital signal, and supplied to the second digital signal processing section which is the same as the conventional one. The second digital signal processing section performs the demodulation of the received digital signal.

Either one of the outputs of the (first) digital signal processing section and the second digital signal processing section is selectively output depending on whether the received signal is the carrier signal or the base-band transmission signal. This is implemented by providing a selecting section (a switch) for selecting one of the outputs. Alternatively, this is implemented by suppressing the signal input from the second analog signal processing section into the second digital signal processing section when the carrier signal is detected.

Thus, the invention described herein makes possible the advantages of (1) providing an effective noise removing method in which the analog signal processing and the digital signal processing are complementarily used, (2) providing a noise removing device utilizing the noise removing method which has a small circuit scale (mounting area) and can be mass-produced at a low production cost and a data communication apparatus using the device, and (3) providing a data communication apparatus which can change its modulation scheme in accordance with the environment and/or purposes (the communication rate, immunity, etc.) for use.

These and other advantages of the present invention will become apparent to those skilled in the art upon reading and understanding the following detailed description with reference to the accompanying figures.

BRIEF DESCRIPTION OF THE DRAWINGS

FIG. 12A is a timing diagram illustrating the operation of the digital section of the receiver according to the invention when a carrier is receiver.

FIG. 13 is a timing diagram illustrating the operation of the digital section of the receiver according to the invention when a signal including a carrier and a noise is received.

FIG. 15A shows the waveform of a transmission data signal, and FIG. 15B shows the waveform of a carrier in Example 2 which is modulated by an ASK modulation method based on the transmission data signal.

FIG. 27A shows a waveform of a transmission data signal, and FIG. 27B shows a waveform of a carrier of 500 kHz which is modulated by an ASK modulation method based on the transmission data signal.

FIG. 28 shows examples of signal waveforms output from a pin photodiode when the ASK modulated signal of 500 kHz is received.

FIGS. 32A and 32B show a data signal waveform and a modulated signal waveform used in the conventional receiver 300.

DESCRIPTION OF THE PREFERRED EMBODIMENTS

Figure 1:
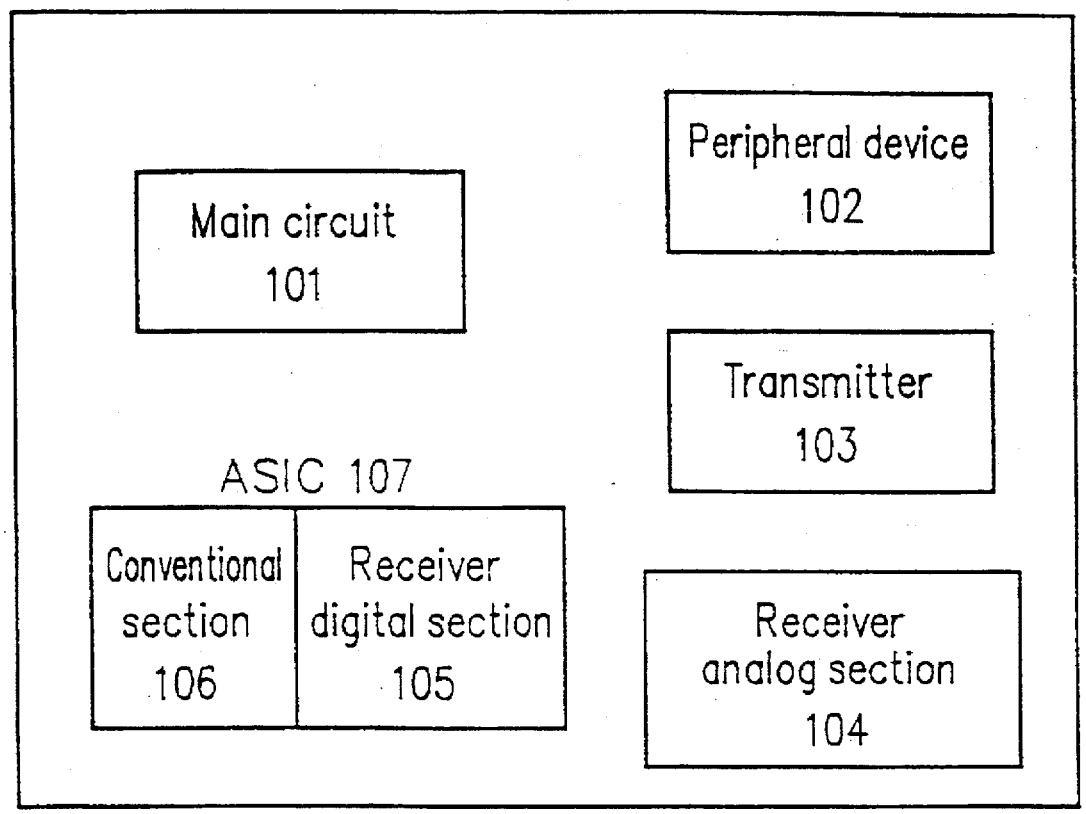
FIG. 1 is a diagram schematically showing information equipment to which a receiver according to the invention can be applied.

FIG. 1 schematically shows a piece of information equipment 100 to which a receiver according to the invention can be applied. The information equipment 100 is, for example, portable information equipment having a wireless communication function. The piece of information equipment 100 can perform bidirectional or unidirectional communication with another similar portable piece of information equipment, a personal data assistant, a personal computer, a word-processor, and a printer. The receiver of the invention can be used in any such equipment.

In the following explanation, a receiver in wireless data communication system is described in the case where an infrared ray is used as the communication medium of the data communication system. However, it is appreciated that the invention is not limited to such specific cases, and the invention can be applied to any other communication media (light, electromagnetic wave, and the like other than infrared ray), and to any other communication system.

Figure 25:
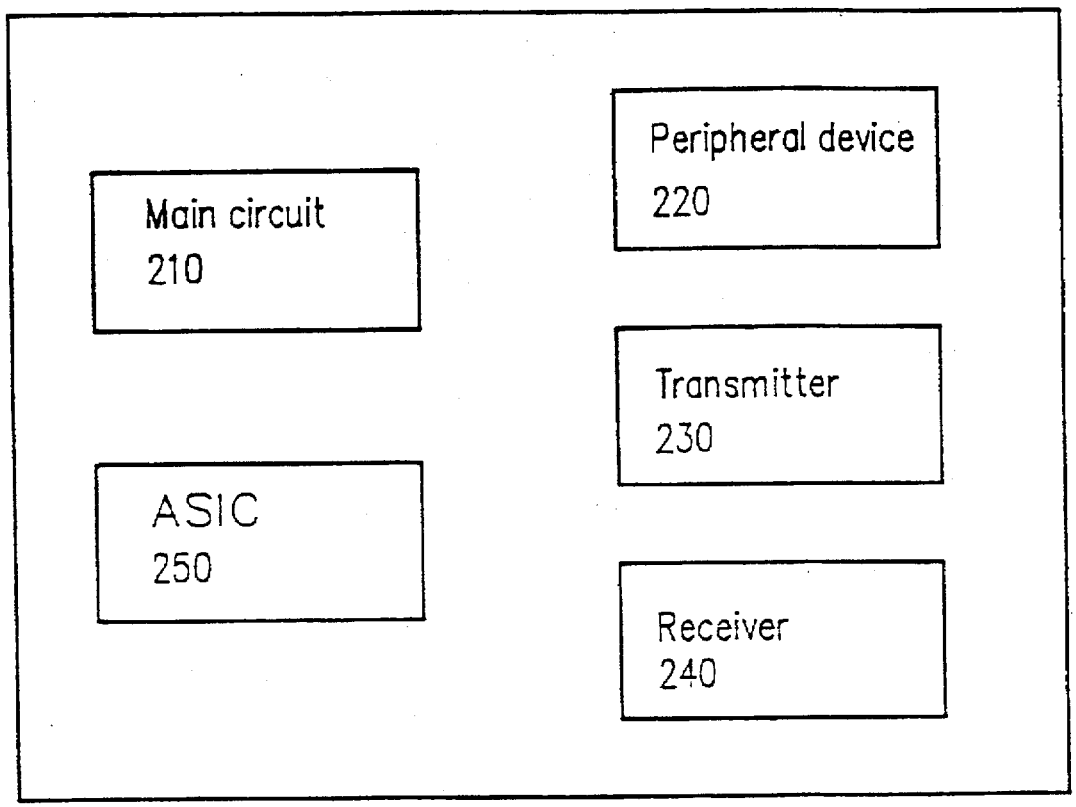
FIG. 25 is a block diagram schematically showing exemplary conventional information equipment having a wireless communication function.
Figure 26:
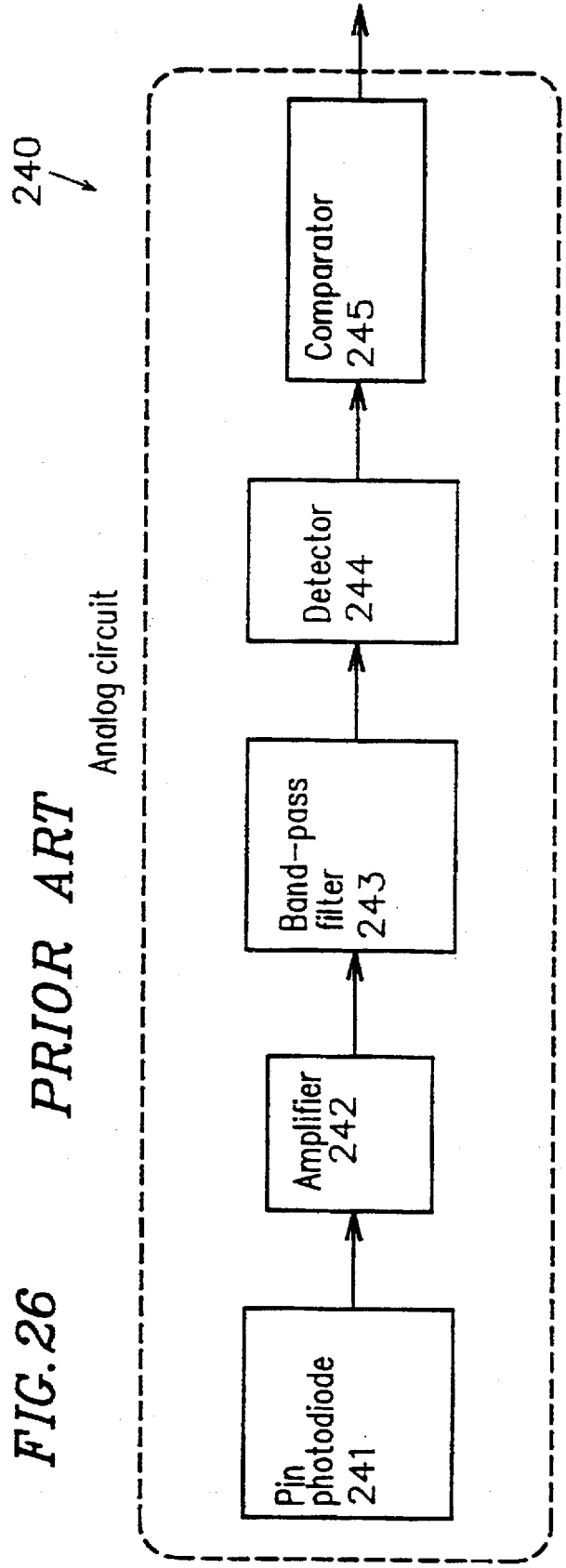
FIG. 26 is a diagram showing an exemplary conventional receiver.
Figure 29:
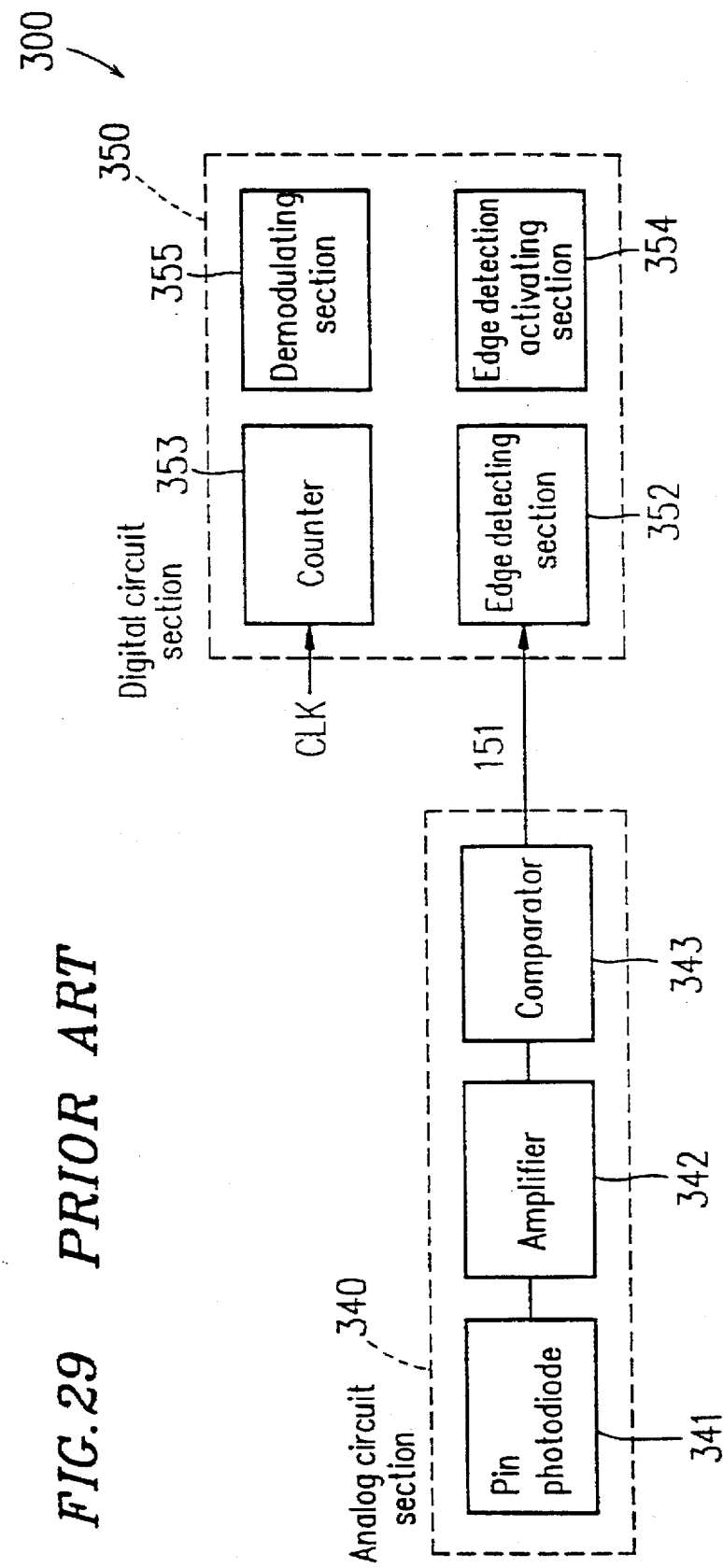
FIG. 29 is a diagram showing another exemplary conventional receiver.
Figure 30:
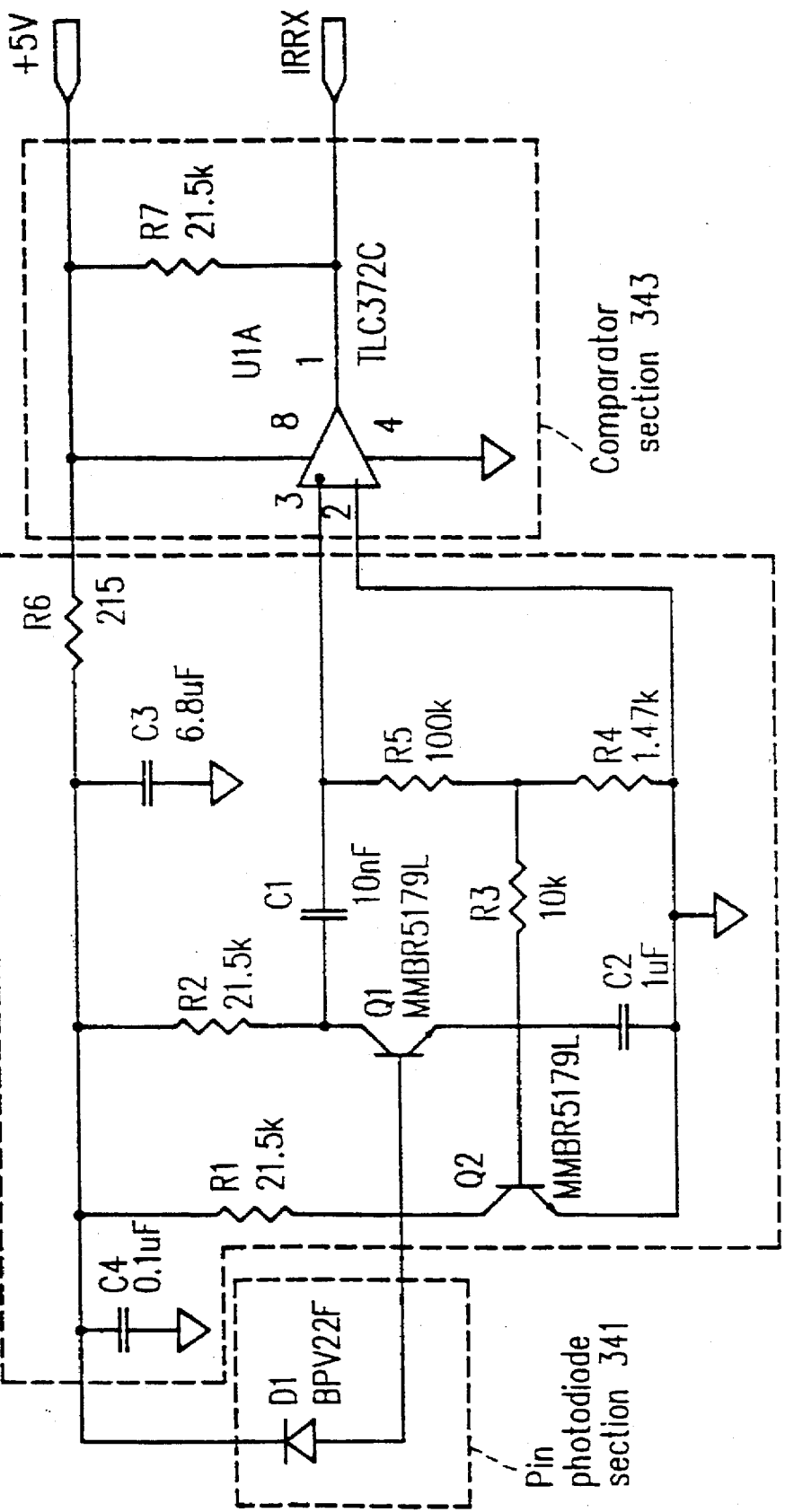
FIG. 30 is a diagram showing specific circuitry of an analog circuit section of the receiver shown in FIG. 29.
Figure 31:
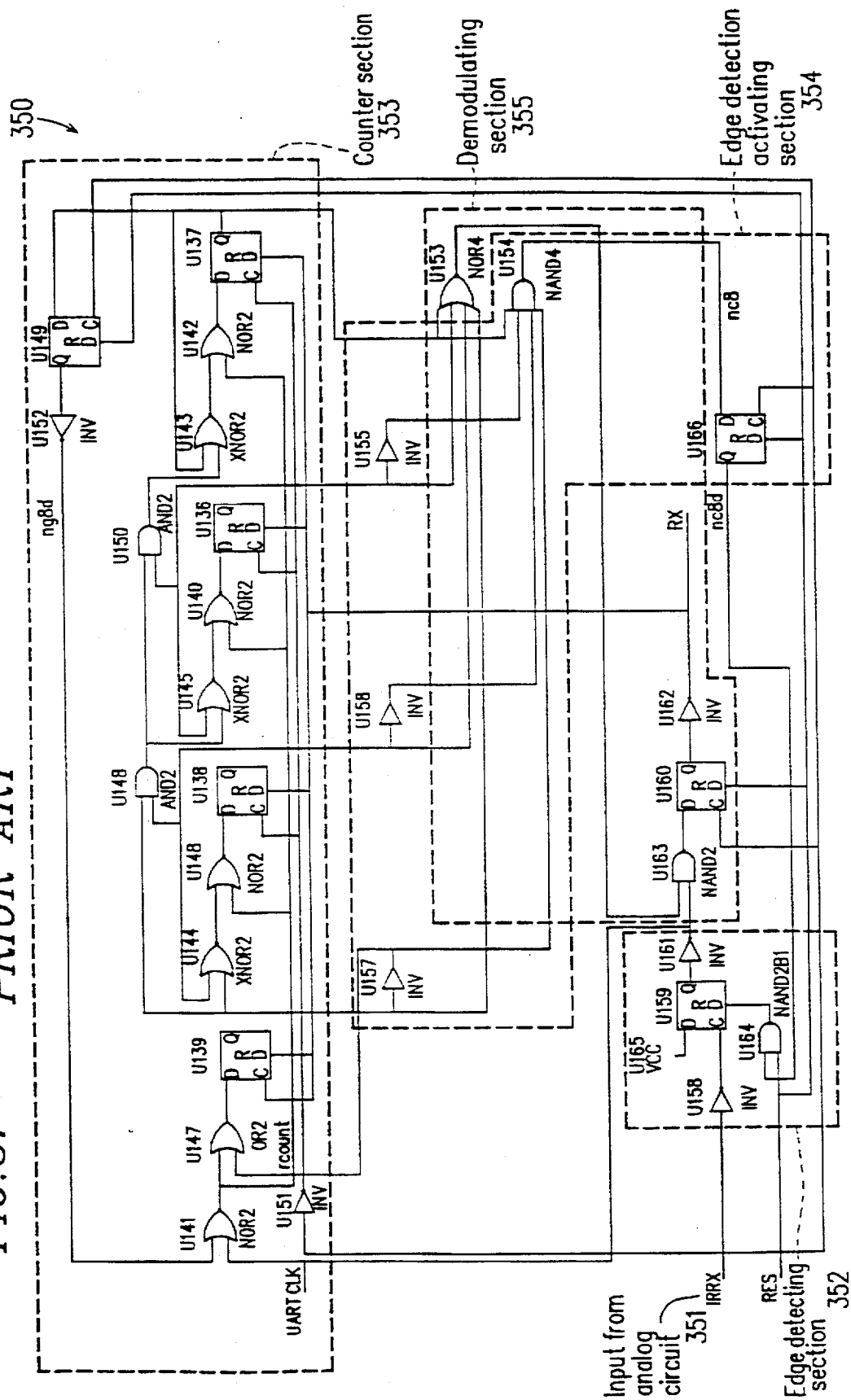
FIG. 31 is a diagram showing the specific circuitry of a digital circuit section of the receiver shown in FIG. 29.
Figure 33:
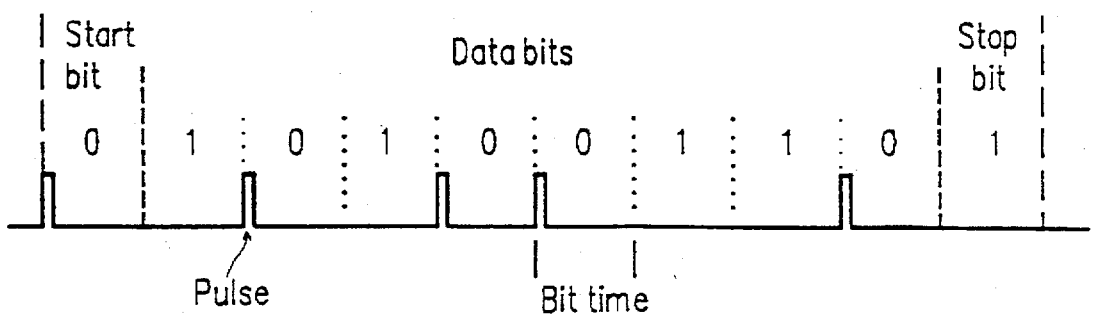
FIG. 33 is a diagram showing a typical data word transmission when the digital signal communication is performed by using the conventional receiver shown in FIG. 29.

The information equipment 100 includes, as is shown in FIG. 1, a main circuit 101 onto which a versatile IC (integrated circuit) such as a CPU (central processing unit) is installed, a peripheral device 102 such as a display device and an input device, a transmitter 103, a receiver analog section 104, and an ASIC (Application Specific Integrated Circuit) 107. The ASIC 107 is dedicatedly used for controlling the peripheral device 102, the transmitter 103 and the analog section 104 of the receiver. The ASIC 107 includes a receiver digital section 105, and a conventional section 105 having the same function as that of a conventional ASIC (e.g., the ASIC 250 of the information equipment 200 shown in FIG. 25).

The receiver according to the invention includes, as shown in FIG. 1, the analog section 104 and the digital section 105. The information equipment 100 is usually provided with a digital circuit section such as an ASIC, so that the receiver digital section 105 can be included in the digital circuit section of the information equipment. If the digital section 105 can be implemented as a small-scale circuit, additional cost for providing another digital section is not so much required.

EXAMPLE 1

Figure 2:
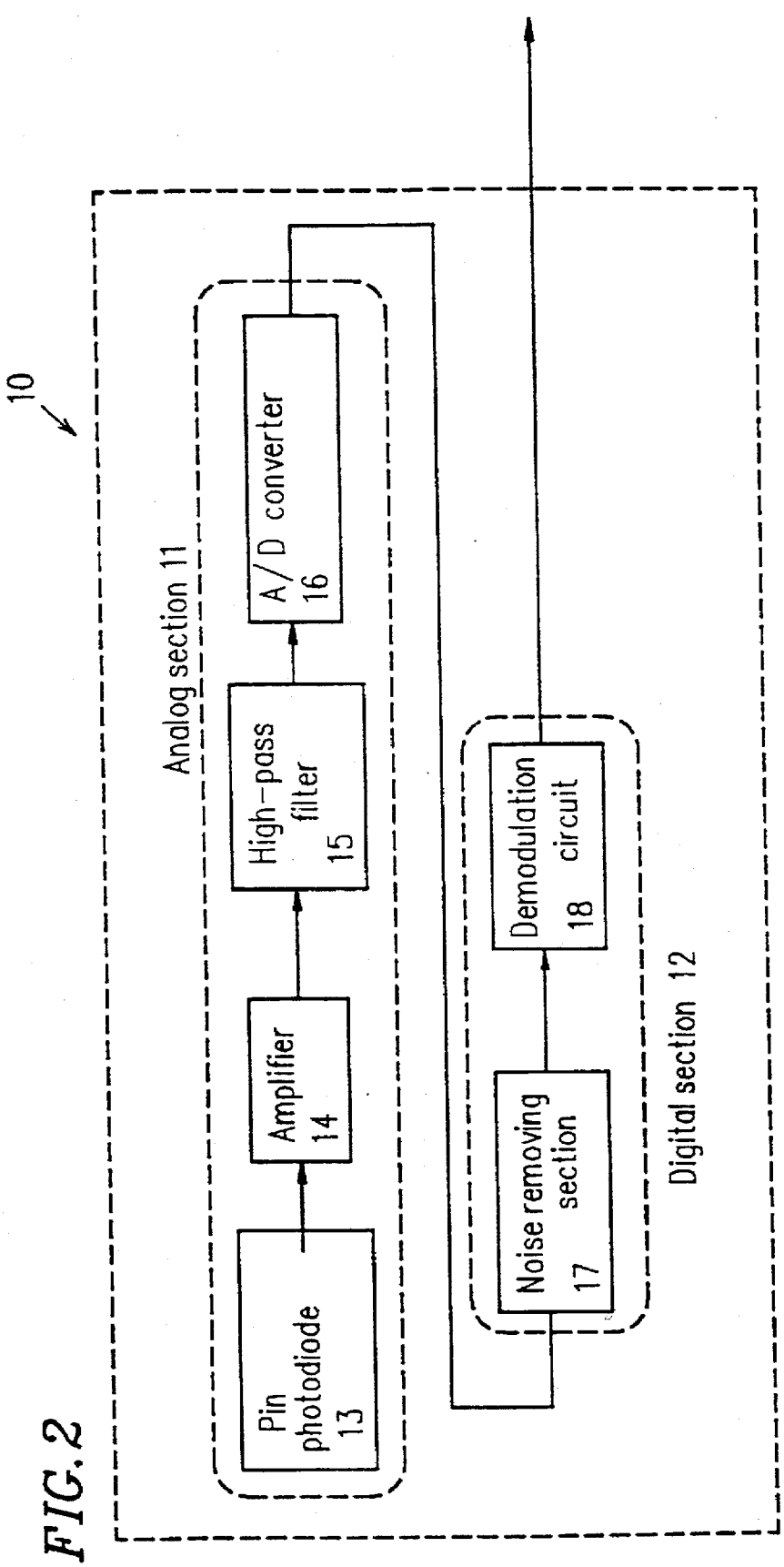
FIG. 2 is a block diagram schematically showing the construction of a receiver in Example 1.
Figure 3A:
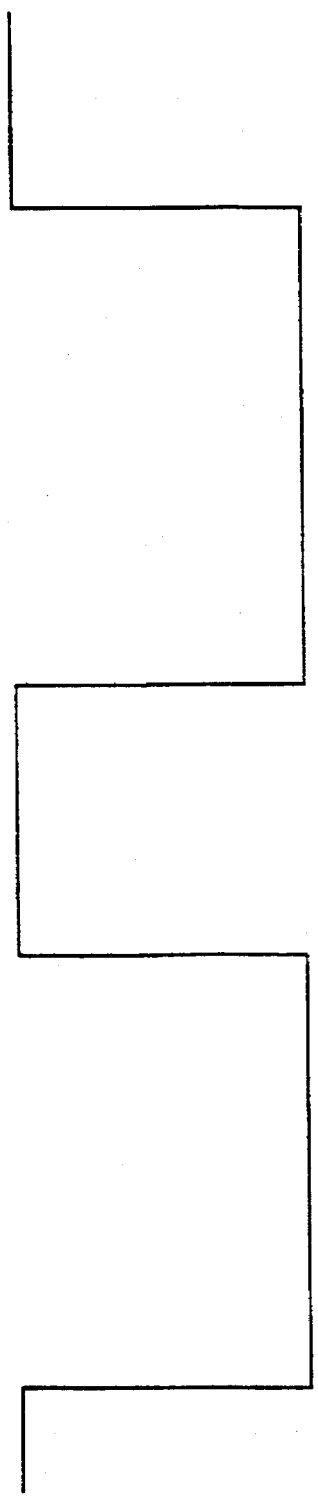
FIG. 3A shows the waveform of a transmission data signal.
Figure 3B:
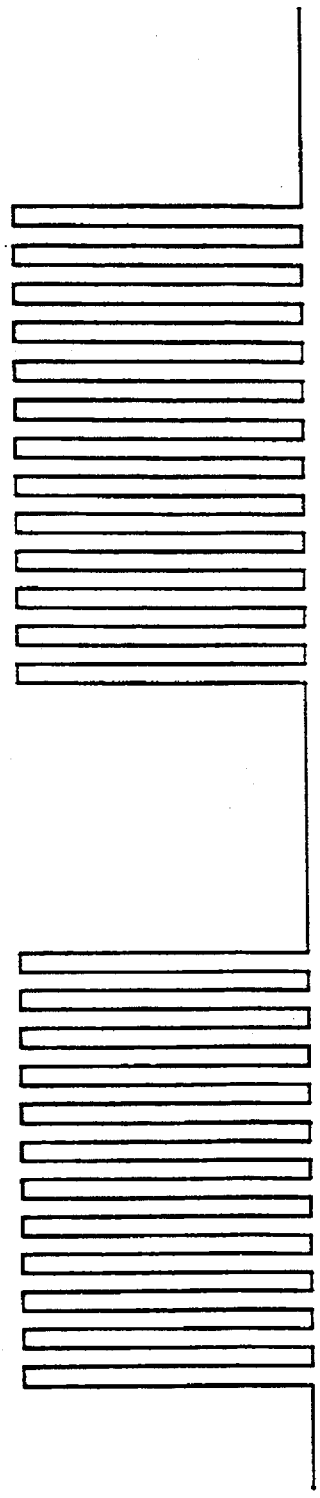
FIG. 3B shows a waveform of a carrier of 500 kHz which is modulated by an ASK modulation method based on the transmission data signal.

Next, a receiver 10 of the invention according to Example 1 will be described with reference to the relevant figures. The receiver 10 is, for example, an infrared receiver unit in an infrared data communication system with an ASK modulation/demodulation method using a carrier of 500 kHz. The construction of the receiver 10 according to Example 1 is schematically shown in FIG. 2. FIGS. 3A and 3B show examples of a transmission data signal 51 and a modulated signal 52, respectively, used in this example.

The transmission data signal 51 may be a digital signal, as shown in FIG. 3A. Based on the transmission data signal 51, the carrier is modulated in the following manner and the modulated signal (transmitting signal) 52 shown in FIG. 3B is output. When the transmission data signal 51 is at a low level (Zero), the carrier of 500 kHz is output at a predetermined amplitude level. When the transmission data signal 51 is at a high level (One), the oscillating wave at 500 kHz is not output (i.e., the amplitude of the carrier is substantially zero). By turning on/off an infrared LED using the modulated signal 52, the data is transmitted.

The receiver 10 includes an analog section 11 and a digital section 12. The analog section 11 is a section for performing analog signal processing. The analog section 11 includes a pin photodiode section 13, an amplifier 14, a high-pass filter 15, and an A/D converter 16. The pin photodiode section 13 receives an infrared signal transmitted from a computer or other information equipment, and converts the signal into an electric signal which is then supplied to the amplifier 14. The input signal is amplified and filtered by the amplifier 14 and the high-pass filter 15. As a result, noises in low frequency ranges are removed. Here, the amplifier 14 and the high-pass filter 15 are not necessarily separated circuits, but are constructed as a single circuit. The signal from which the noises in low frequency ranges have been removed is converted into a digital signal by the A/D converter 16, and then applied to the digital section 12.

The digital section 12 includes a noise removing circuit 17 and a demodulation circuit 18, and performs the digital signal processing. The noise removing circuit 17 substantially functions as a low-pass filter, and removes noises in high frequency ranges. The combination of the analog section 11 and the digital section 12 implements a band-pass filter, so that signals (noises) having frequencies outside of a predetermined frequency band including the carrier frequency are completely removed. Then, the transmitted data signal is demodulated by the demodulation circuit 18.

Figure 4:
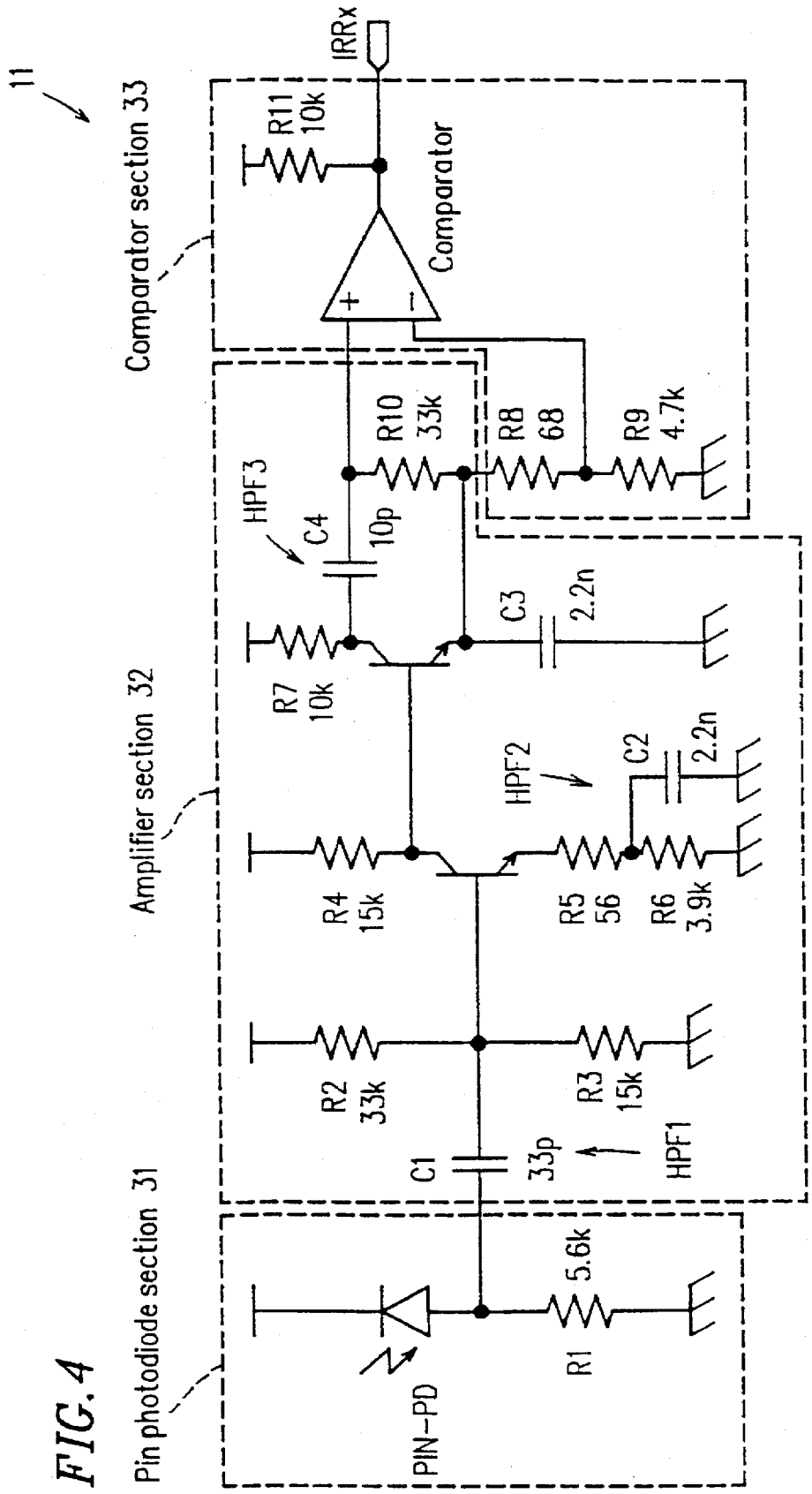
FIG. 4 is a diagram of exemplary circuitry of an analog section of the receiver according to the invention.

Next, the analog section 11 is described in more detail. An exemplary construction of the analog section 11 is shown in FIG. 4. The analog section 11 includes a pin photodiode section 31, an amplifier section 32, and a comparator section 33.

Figure 6:
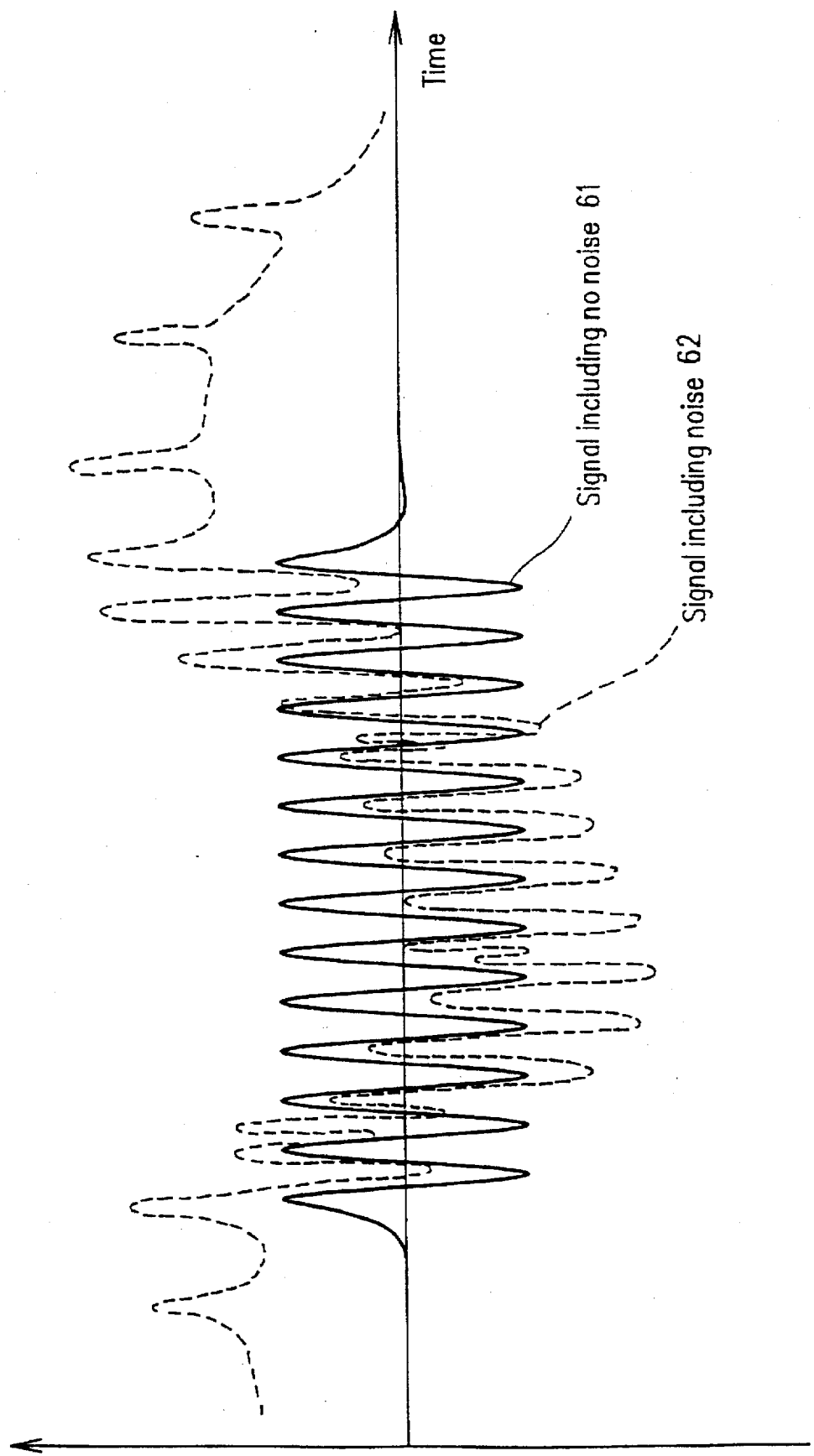
FIG. 6 shows examples of signal waveforms output from a pin photodiode when the ASK modulated signal of 500 kHz is received.

The pin photodiode section 31 performs current to voltage conversion with high impedance, so that the ON/OFF of the infrared signal transmitted from the outside is converted into an electric signal. FIG. 6 shows an example of a signal waveform output from the pin photodiode section 31. Signal 62 shows the signal waveform which is output when the pin photodiode 31 receives a transmitted signal including a noise, e.g., when a noise source generating infrared rays over a wide frequency band such as a fluorescent light or the like exists near the pin photodiode 31. As a comparison, in FIG. 6, a signal 61 which is output, when the pin photodiode 31 receives a transmitted signal including no noise is also shown.

Figure 7:
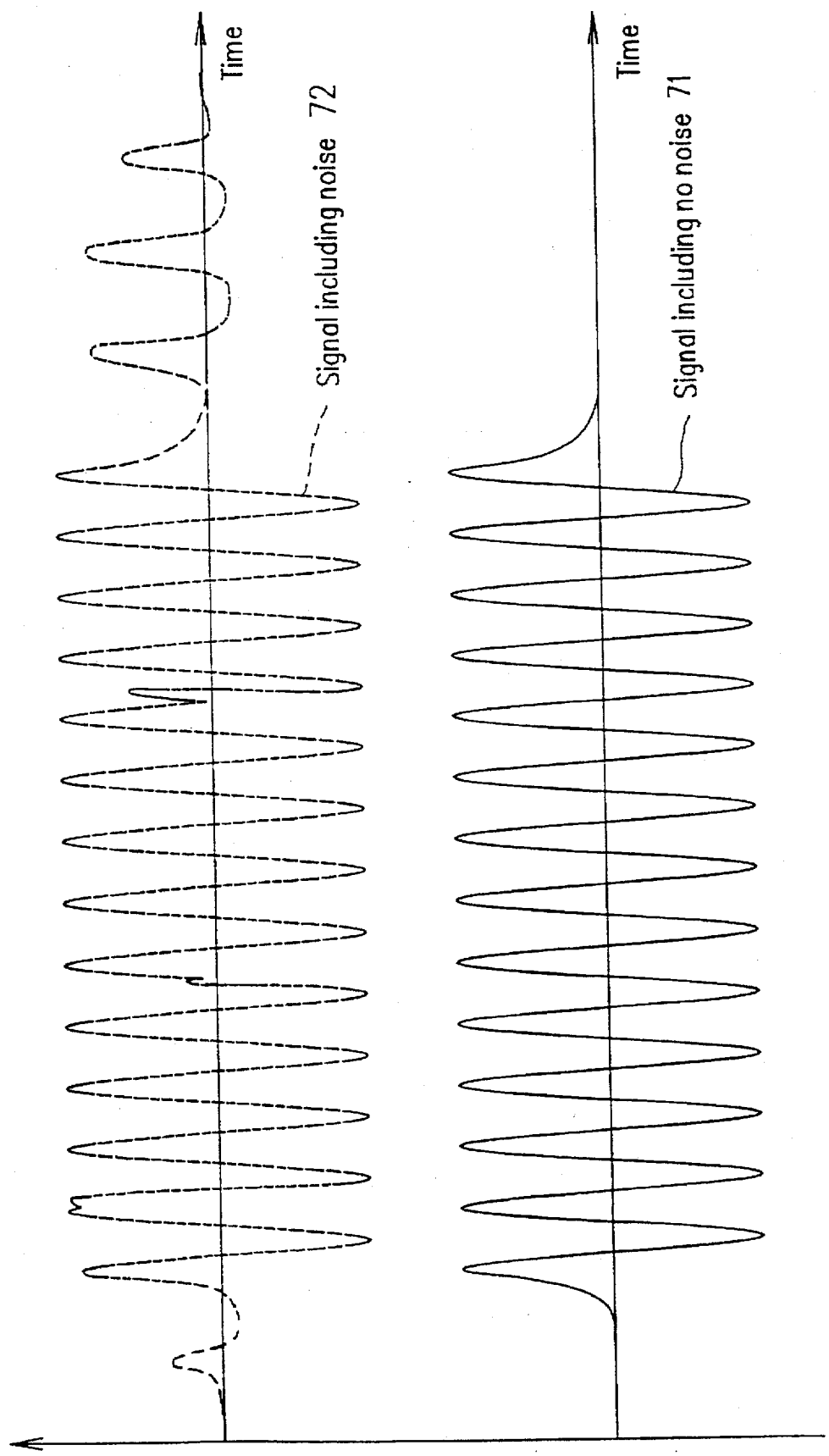
FIG. 7 shows examples of signal waveforms output from an amplifier section of the analog section of the receiver according to the invention.
Figure 10:
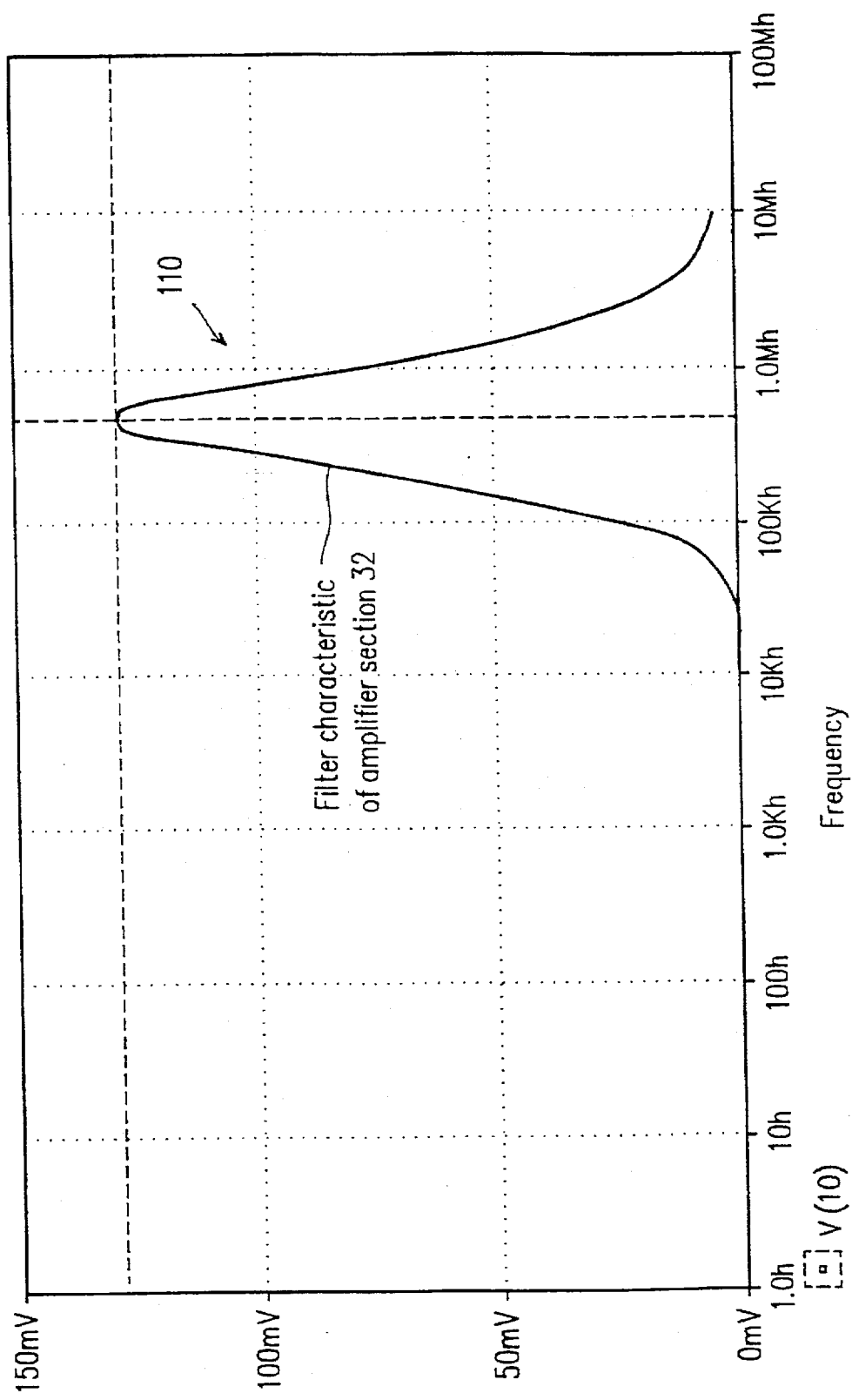
FIG. 10 is a diagram illustrating the filter characteristic of the amplifier section of the analog section of the receiver according to the invention.

The amplifier section 32 includes high-pass filters HPF1, HPF2, and HPF3, and has a filter characteristic of the three high-pass filters. Therefore, the amplifier section 32 amplifies the signal supplied from the pin photodiode section 31, and also performs the high-pass filtering (the amplifier section 32 corresponds to the amplifier 14 and the high-pass filter 15 in FIG. 2). By the high-pass filters HPF1–MPF3, noises in low frequency ranges are removed from the input signal. FIG. 7 shows exemplary signal waveforms output from the amplifier section 32. Signal 71 is shown for comparison, and indicates a signal waveform including no noise. Signal 72 includes no noise in low frequency ranges but includes noise in high frequency ranges. The filter characteristic 110 of the amplifier 32 is shown in FIG. 10. The filter characteristic 110 shows a high-pass filter characteristic which steeply cuts off the low frequency ranges by three high-pass filters. In the high frequency ranges, the filter characteristic 110 has a low-pass filter characteristic which is not steep due to the transistor characteristics.

The output of the amplifier section 32 is input into the comparator section 33 (corresponding to the A/D converter 16 in FIG. 2), and is converted into a digital signal 41 (signal IRRx). When the input signal is digital, the A/D converter 16 can be implemented as a simple comparator as shown in FIG. 4. The comparator section 33 converts the input signal into a digital signal depending on whether the level of the input signal exceeds a threshold value which is determined by resistances R8 and R9. Herein, the low-frequency noises are removed by the amplifier section 32, so that the frequency component of the carrier cannot be collapsed during the conversion into the digital signal.

Figure 8:
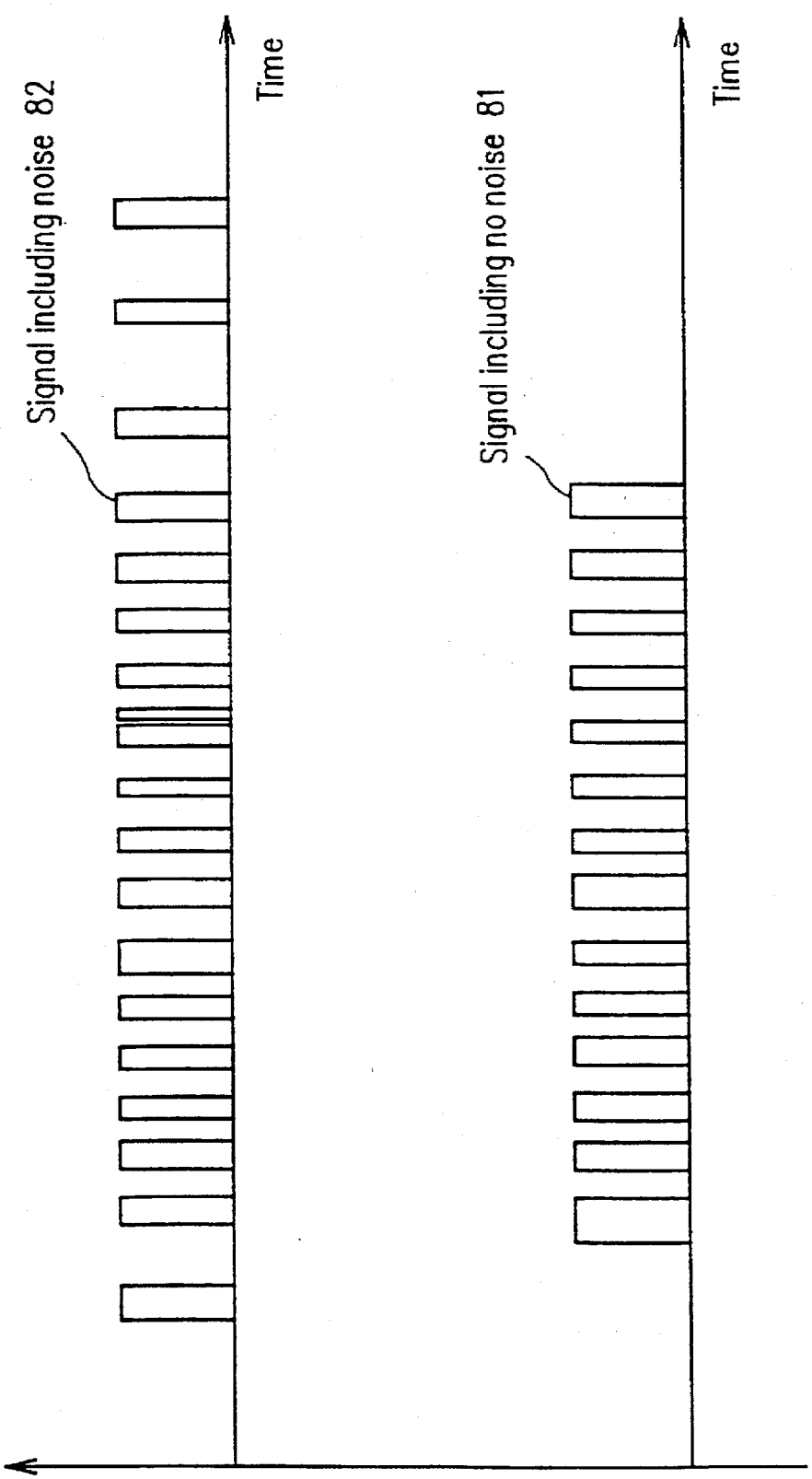
FIG. 8 shows examples of signal waveforms output from a comparator section of the analog section of the receiver according to the invention.

FIG. 8 shows exemplary signal waveforms output from the comparator section 33. The signals 71 and 72 are converted into digital signals 81 and 82 by the comparator section 33. The signal 81 includes no noise and the signal 81 is shown for comparison. The signal 82 includes no noise in low frequency ranges, but includes pulse-like noises in high frequency ranges.

Figure 5:
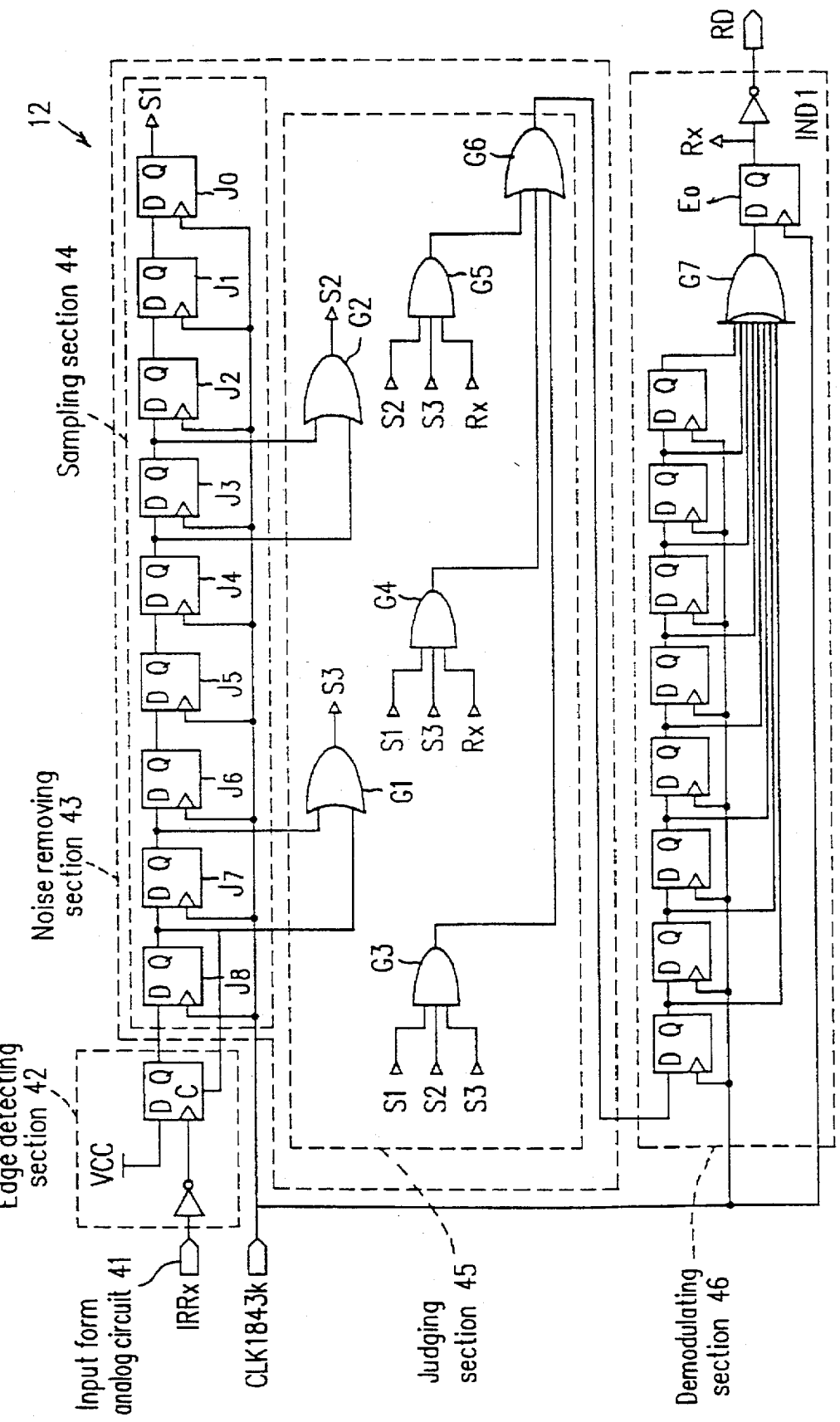
FIG. 5 is a diagram of exemplary circuitry of a digital section of the receiver in Example 1 of the invention.

Next, the digital section 12 is described in more detail. FIG. 5 shows exemplary circuitry of the digital section 12. The digital section 12 includes an edge detecting section 42, a noise removing section 43, and a demodulating section 46. The noise removing section 43 includes a sampling section 44 and a judging section 45. The digital section 12 is designed so as to pass the carrier of 500 kHz±50 kHz.

The edge detecting section 42 receives the digital signal 41 from the analog section 11. The edge detecting section 42 detects a change of the digital signal 41 from the high level (logic 1) to the low level (logic 0) (i.e., the falling edge), and outputs an edge detection signal (logic 1) to the sampling section 44. The edge detection signal is output in a synchronized manner with a clock signal (a sampling clock). In this example, as the sampling clock, a signal of 1.8 MHz is used. In order to constitute a band-pass filter having a steep filter characteristic centered at 500 kHz using a digital circuit, it is preferred to use a clock having a frequency of 1.8 MHz or more.

The sampling section 44 stores the edge detection signal output from the edge detecting section 42 for a predetermined period. The sampling section 44 can be implemented as a shift register having m D-type flip-flops which are connected in series. In this example, nine D-type flip-flops are used. The series of flip-flops are indicated by $J_{m-1}$, $J_{m-2}$, $J_{m-3}$, ..., $J_0$ (m=9) in the order from the signal input side. The sampling section 44 samples the output from the edge detecting section 42 at the timing of the clock signal (i.e., at every 543 ns), and stores the sampled signal in the respective D-type flip-flops. The edge detection signal sampled by the sampling clock at 1.8 MHz is stored in the nine D-type flip-flops, so that a signal pattern for a time period of approximately 5 μs can be stored.

The judging section 45 judges whether the received signal is an ASK carrier or not, based on the pattern of the edge detection signal stored in the sampling section 44. In this example, whether the received signal is the ASK carrier signal of 500 kHz or not is judged based on whether three signal pulses at intervals of 2 μs are detected or not. In order to perform the judgment, it is necessary for the sampling section 44 to store the edge detection signals for a period of 4 μs or more. As described above, since the sampling section 44 can store the signal for about 5 μs, it is sufficient for the judgment.

The judging section 45 can be constructed by three OR gates G1, G2, and G6, and three AND gates G3, G4, and G5. To the OR gate G1, the outputs from the flip-flops $J_8$ and $J_7$ are input. To the OR gate G2, the outputs from the flip-flops $J_4$ and $J_3$ are input. To the AND gate G3, the output S1 from the flip-flop $J_0$ and the output S2 from the OR gate G2, and the output S3 from the OR gate G1 are input. To the AND gate G4, the output S1 from the flip-flop $J_0$, the output S3 from the OR gate G1, and a signal Rx are input. Here, the signal Rx is generated in the modulating section 46, and indicates that the carrier is now being received. To the AND gate G5, the output S2 from the OR gate G2, the output S3 from the OR gate G1, and the signal Rx are input. To the OR gate G6, the outputs from the AND gates G3, G4, and G5 are input. The output from the OR gate G6 is input into the demodulating section 46.

Figure 9:
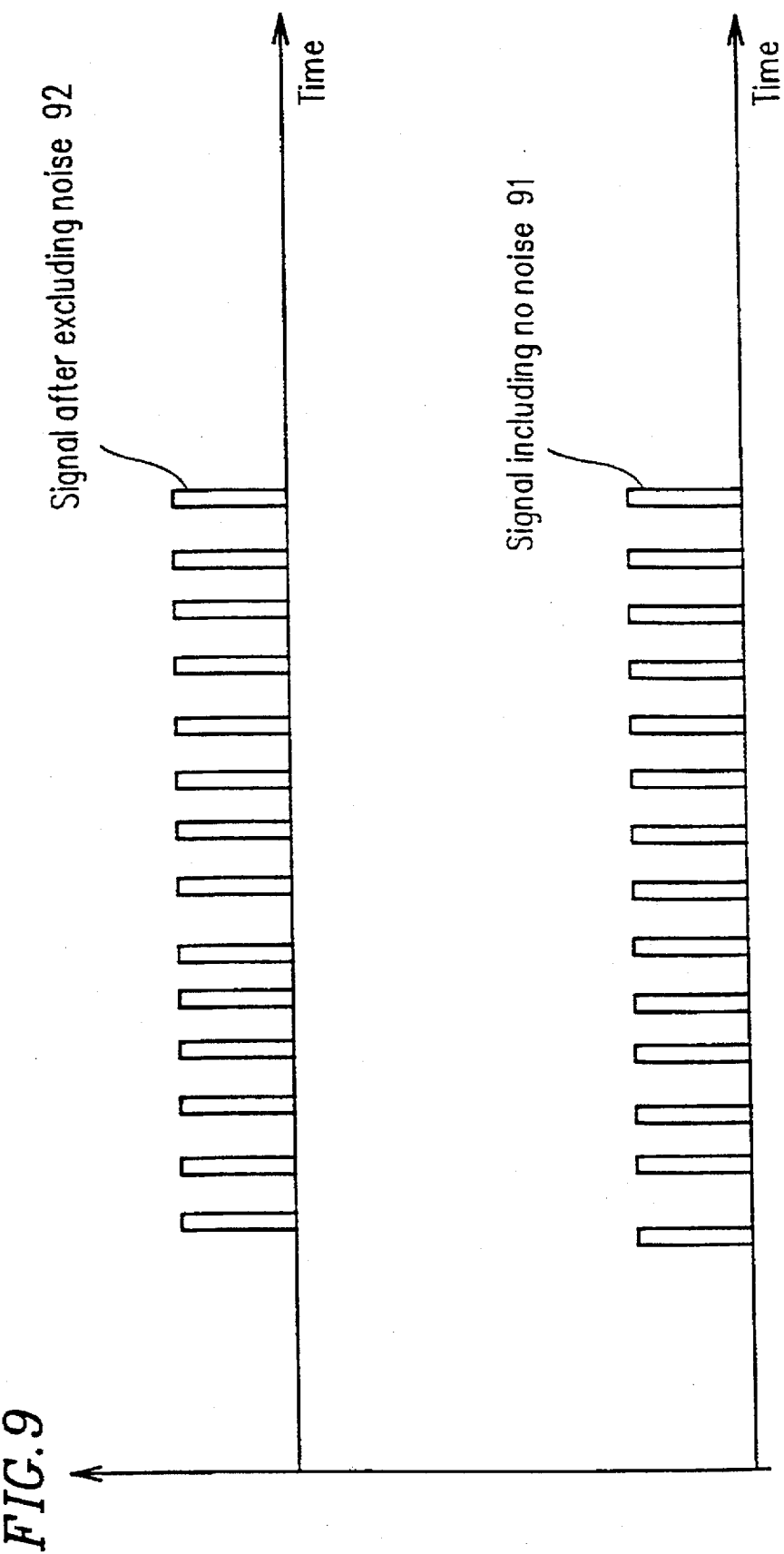
FIG. 9 shows examples of signal waveforms output from a judging section of the digital section of the receiver according to the invention.
Figure 11:
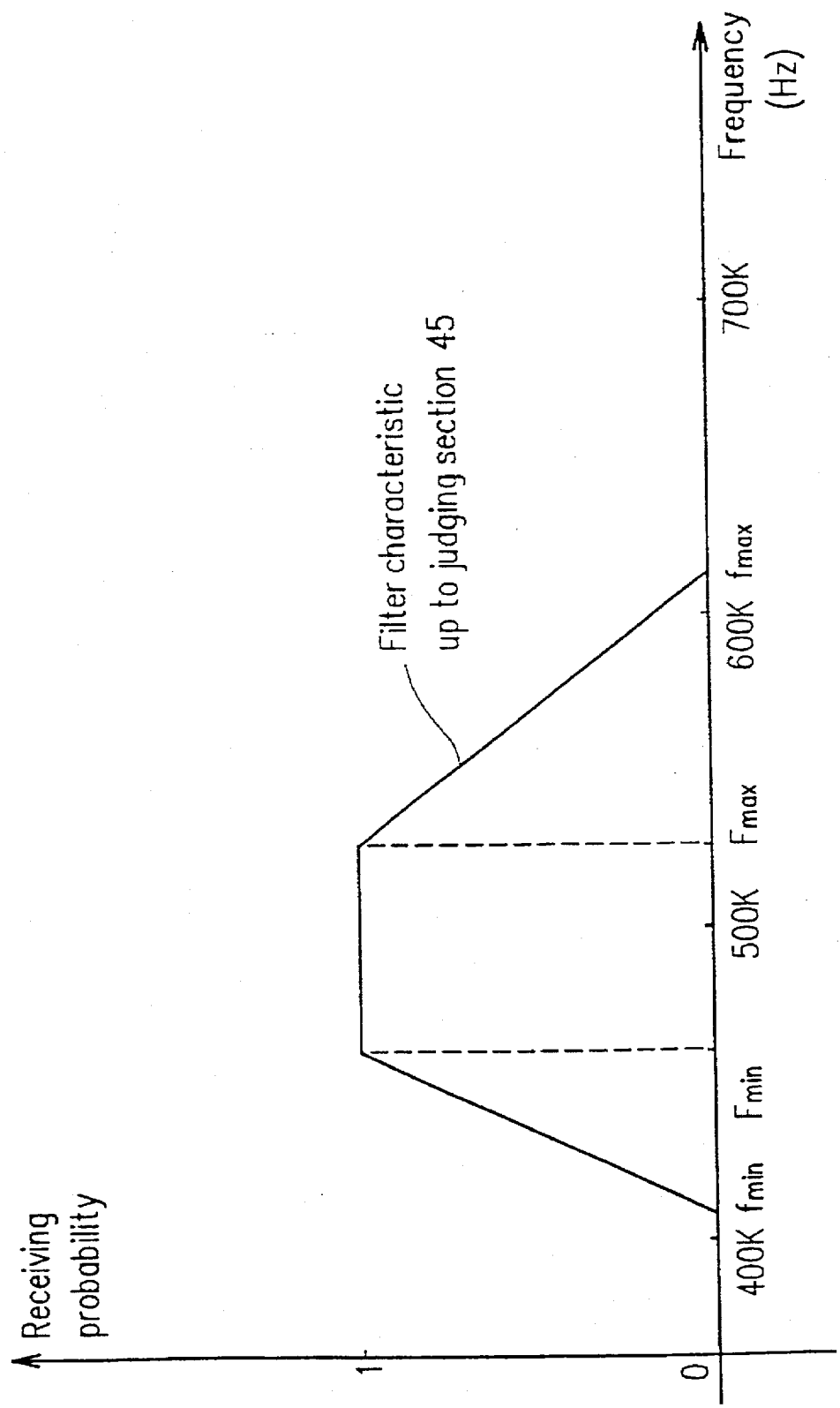
FIG. 11 is a diagram illustrating the filter characteristic before the judging section of the digital section of the receiver according to the invention.

FIG. 9 shows examples of signal waveforms output from the noise removing section 43 (the judging section 45). The signal 82 including noises of high frequencies is subjected to the process of the noise removing section 43 so as to be converted into a signal 92. In the signal 92, pulses which are not synchronized with the timing of 500 kHz are removed. For comparison, FIG. 9 also shows a signal 91 which is converted from the signal 81 which includes no noise. FIG. 11 shows the filter characteristic 111 up to the judging section 45. It is seen that the combination of the analog section 11 (the amplifier section 32) and the digital section 12 (the noise removing section 43) implements a band-pass filter having a sufficiently steep characteristic.

The frequency characteristic of a digital filter is determined by the following four parameters. That is, frequencies $f_{max}$ and $f_{min}$ which provide a frequency range in which the probability that the received signal is judged as the carrier by the judging section 46 (hereinafter referred to as a receiving probability) is not 0, and frequencies $F_{max}$ and $F_{min}$ which provide a frequency range in which the receiving probability is 1. These parameters are given by the sampling clock, and the method for selecting a flip-flop from which the judging signal is taken.

The frequency range of the carrier is 500±50 kHz in this example, so that the parameters are set so as to satisfy the following conditions: $F_{min}$<450 kHz, and $F_{max}$>550 kHz. In addition, in view of the immunity requirement, the parameters are set so as to satisfy the following conditions: $f_{min}$>400 kHz, and $f_{max}$<610 kHz. In order to distinguish the carrier from a noise having a frequency closer to the carrier frequency, it is necessary to use a sufficiently fast sampling clock. For example, in order to distinguish a signal of 400 kHz from the carrier of 450 kHz, a sampling clock of 1.73 MHz or more is required. In order to distinguish a signal of 610 kHz from the carrier of 550 kHz, a sampling clock of 2.8 MHz or more is required. Preferred values of the parameters are as follows: $f_{min}$=410 kHz, $F_{min}$=434 kHz, $F_{max}$=567 kHz, and $f_{max}$=614 kHz (in the case of a sampling clock=3.6864 MHz).

The demodulating section 46 performs the time extension for the signal which is judged by a time required for the judgment, so as to demodulate the ASK signal. The demodulating section 46 can be constructed by, for example, eight D-type flip-flops which are connected in series, an OR gate G7 into which respective outputs of the eight flip-flops are input, another flip-flop, and an inverter. When the judging section 45 outputs a value 1, the last flip-flop $E_0$ of the demodulating section 46 continues to output the logic 1 (the signal Rx), for the time period required for the sampling. As a result, during the receiving of the carrier, the output of the demodulating section 46 is kept at the low level, so that the transmitted data signal is demodulated.

Figure 12B:
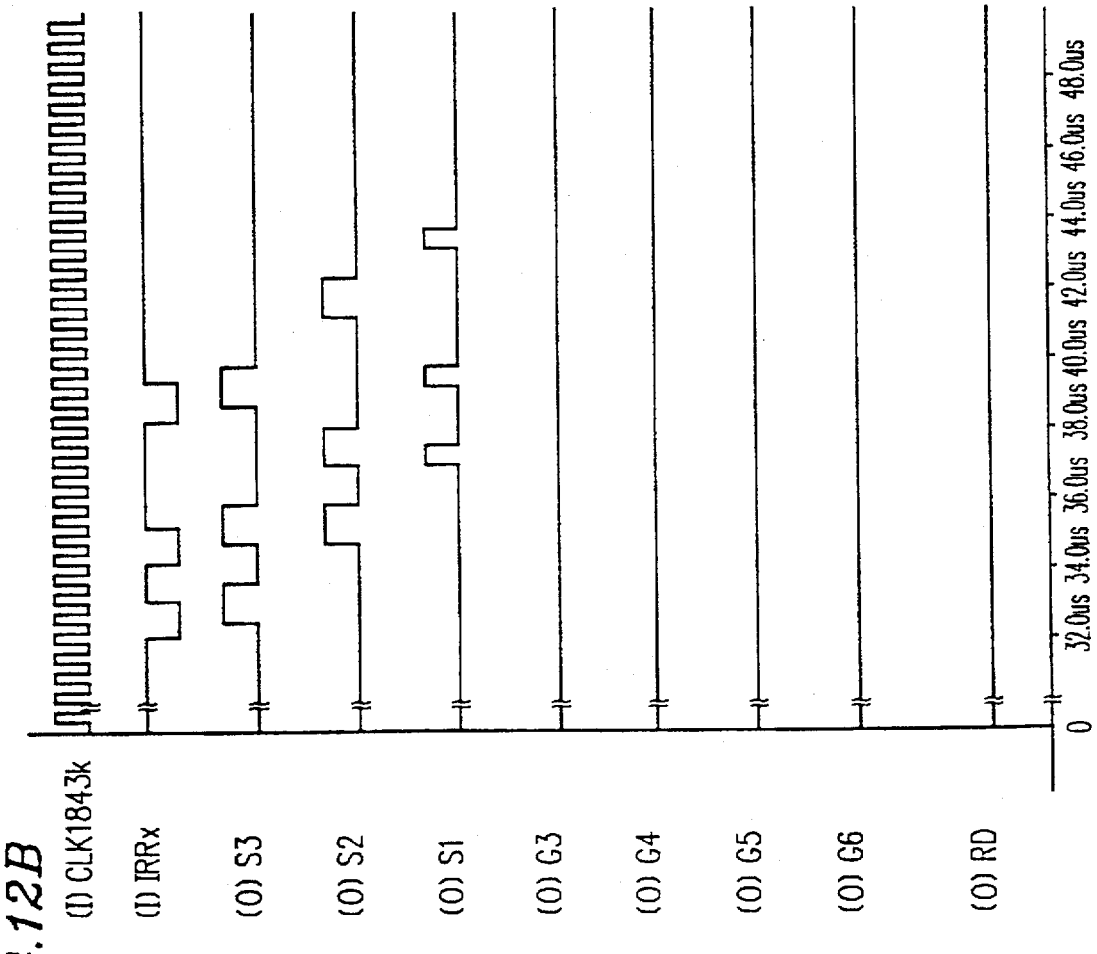
FIG. 12B is a timing diagram illustrating the operation of the digital section when a noise is received.

Next, the judging method in the judging section 45 will be described in more detail with reference to FIGS. 5, 12A, and 12B. FIGS. 12A and 12B are timing diagrams illustrating the operation of the digital section 12.

Hereinafter, an example case where a signal which is input at a reference time $t_0$ is output from the flip-flop $J_0$ (the output signal S1) is described. In FIG. 5, the output S2 of the OR gate G2 corresponds to the input signal at time $t_0$+2 μs, and the output S3 of the OR gate G1 corresponds to the input signal at time $t_0$+4 μs. Therefore, the case where the output S1 of the flip-flop $J_0$, the output S2 of the OR gate G2, and the output S3 of the OR gate G1 are all at the high level (logic 1) (i.e., the case where the output of the AND gate G3 is 1) indicates that three pulse signals are detected at timings of 500 kHz. Then, the judging section 45 judges that the carrier is received, so that the output of the OR gate G6 becomes the high level (logic 1). It is seen from FIG. 12A that, when pulses ($P_1$, $P_2$, and $P_3$ in the figure) are obtained in the outputs S1, S2, and S3, respectively, the output of the OR gate G6 (in this figure, also indicated by G6) becomes the high level ($P_4$), and a low-level signal ($P_5$) is output from the demodulating section 46 to the ASK carrier.

In this example, the criteria employed in the judging section 45 are changed depending on the fact that the carrier is now being received or not. That is, the AND gates G4 and G5 are provided as shown in FIG. 5, so that if two of the three pulses indicating the carrier are detected (i.e., the outputs S1 and S2=1 or the outputs S2 and S3=1) during the period in which the carrier is now being received (the signal Rx=1), the received signal is judged as being the carrier. The purpose of this provision is to make the judgment whether the signal is the carrier or not resistive against noises (i.e., to make the judgment not to be influenced by noises).

For example, when there exist very strong noises, a pulse of the carrier may be missed due to the existence of noises (a missed pulse $q_0$ shown in FIG. 12A). In this case, three pulses are missed in the output from the AND gate G3. However, the output is compensated for by the pulse $q_1$ of the output signal from the AND gate G4 and the pulse $q_2$ of the output signal from the AND gate G4, so that the pulses $q_3$ and $q_4$ are added to the output signal of the OR gate G6 which will be the output of the judging section 45. Accordingly, the output signal RD from the demodulating section can keep the low level for a period in which the ASK carrier is received, so that it is possible to obtain a correct data signal.

In order to accommodate the width of carrier frequencies (500±50 kHz), the logic ORed outputs of two flip-flops in the sampling section 44 are used for the judgment in FIG. 5 (e.g., G1).

Next, the case where a noise signal which is not a carrier is received is described. As shown in FIG. 12B, when a pulse due to the noise is detected in the OR gates G1 and G2, the output of the judging section 45 is zero. Thus, the noise is removed. The input signal is judged as the carrier, only when three successive pulses are detected at timing synchronized with the carrier frequency. Therefore, any erroneous judgment can be prevented.

The operation of the digital section 12 when a signal including a carrier and a noise is received is shown in FIG. 13. When a high-frequency noise $r_1$ is input, the output signal S1 of the flip-flop $J_0$ includes a pulse $r_2$ caused by the noise in the input signal. However, any signal which is not synchronized with the carrier frequency is removed, so that the output signal G6 of the judging section 45 is a correct pulse sequence (block A enclosed by broken line in FIG. 13). In the case where a pulse of the carrier is missed due to a noise (a missed pulse $r_0$), a pulse $r_4$ is added to the output signal G6 (block B enclosed by broken line in FIG. 13) in the same way as described with reference to FIG. 12B. Block C enclosed by broken line shows the case where a single noise pulse $r_5$ is removed. When there is no pulse in the output S3 of the OR gate G1, a pulse is removed in the output signal of the judging section 45 (block B' enclosed by broken line in FIG. 13 ). This is performed for judging the end of carrier correctly. If any pulse in the output S3 is missed during a time period in which the carrier is successively received, the output signal of the modulating section is kept at the low level. Thus, there occurs no problem. It is preferred that the number of signal pulses used for the judgment is three or more in terms of the judgment accuracy.

As the result of the operation of the noise removing section 43, it is possible to remove noises over a wide range including the carrier frequency. The modulating section 46 can be modified in accordance with the type of transmitted data signal. A device up to the judging section 45 can be applied to various types of receivers as a noise removing device.

In this example, the judging section 45 and the demodulating section 46 are separately provided as shown in FIG. 5. However, they are not necessarily provided as separate components. By integrating the digital processing and the demodulating processing for the noise removing into one unit, the change of modulated wave can be attained by the change of the digital section.

By changing the construction of the digital section 12 in this invention, a receiver capable of receiving different modulated signals can be easily constructed. For example, by dividing the frequency of the sampling clock by two, a receiver in an ASK system at 1000 kHz can be implemented. By changing the criteria used in the judging section 45, a receiver capable of receiving different modulated signals can be easily constructed. The change of criteria can be easily attained by changing the number of flip-flops connected in series in the sampling section 44, by appropriately selecting the outputs of flip-flops used for the judgment, and by switching over the outputs by providing a switching element (such as a transistor) between the flip-flops and the AND gates to which the flip-flop outputs are connected.

The present invention can be applied to a receiver including an amplifier and a band-pass filter in a conventional analog signal processing system, in any type of data communication in addition to the wireless infrared communication system.

The receiver 10 according to the invention can be used with a computer unit provided with an infrared transmitting/receiving device, as a so-called portable information terminal device. A portable information terminal device is often used on a desk, and hence it is often influenced by a fluorescent lamp which is a noise source against the infrared communication. Especially, an inverter type fluorescent lamp which is now widely used emits light in which a pulse-like noise is superimposed on a low frequency component of about 40 kHz. According to this example, it is possible to effectively remove such noises.

EXAMPLE 2

Figure 14:
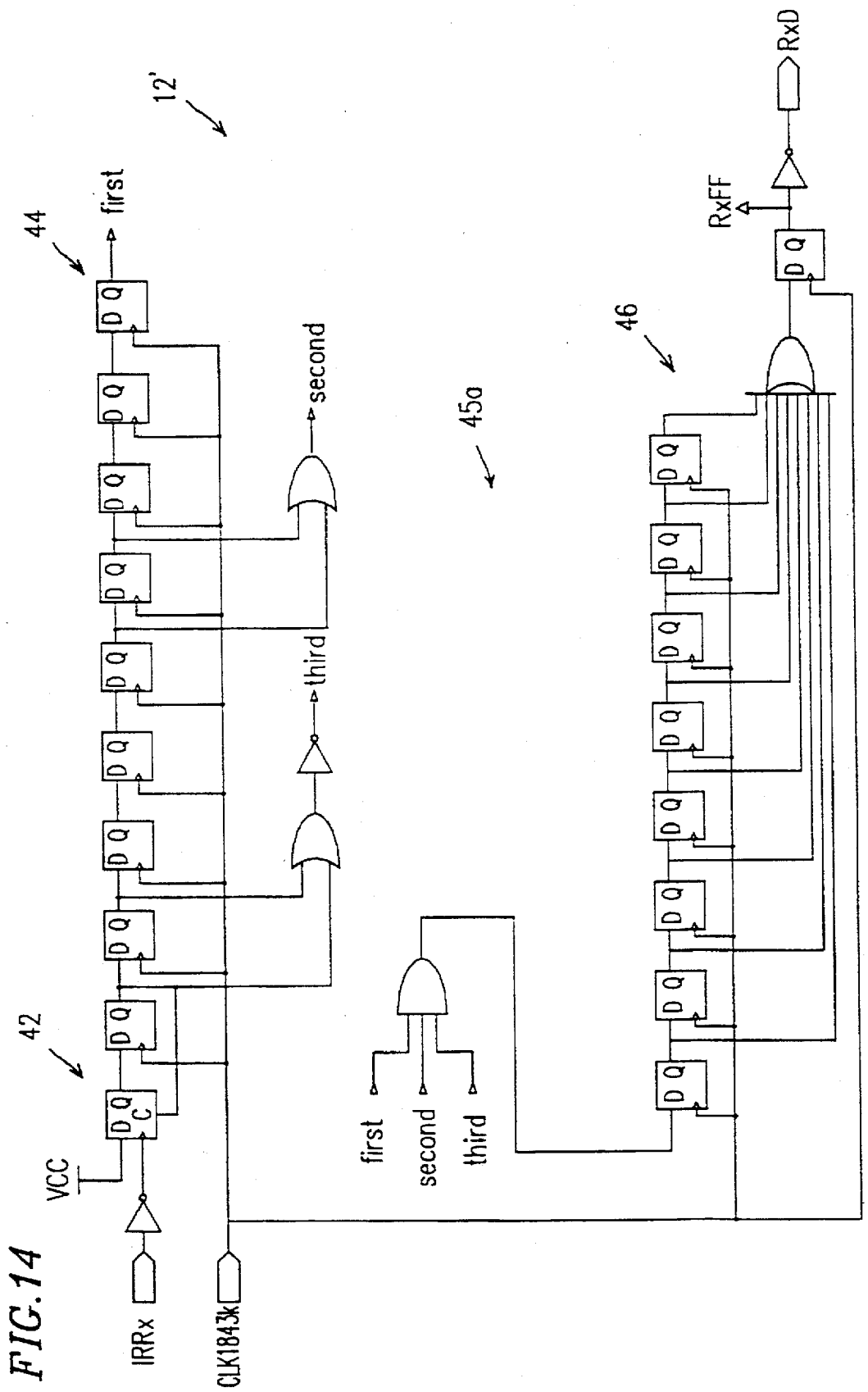
FIG. 14 is a diagram showing the circuitry for a digital section of a receiver in Example 2 according to the invention.

FIG. 14 shows the construction of a digital section 12' of a receiver in Example 2 according to the invention. The digital section 12' uses one AND gate G in a judging section 45a. The other components are the same as those in the digital section 12 in Example 1. The modulating method used in this example is shown in FIG. 15. Based on the data signal 151, the carrier is modulated, and the modulated signal 152 is transmitted. According to this example, the immunity against noises is somewhat reduced, but the amount of power consumption by the transmitter side can be reduced.

EXAMPLE 3

In Example 1, a sampling clock of 1.8 MHz was used. In this example, a case where a sampling clock of 3.5795 MHz is used is described.

Figure 16:
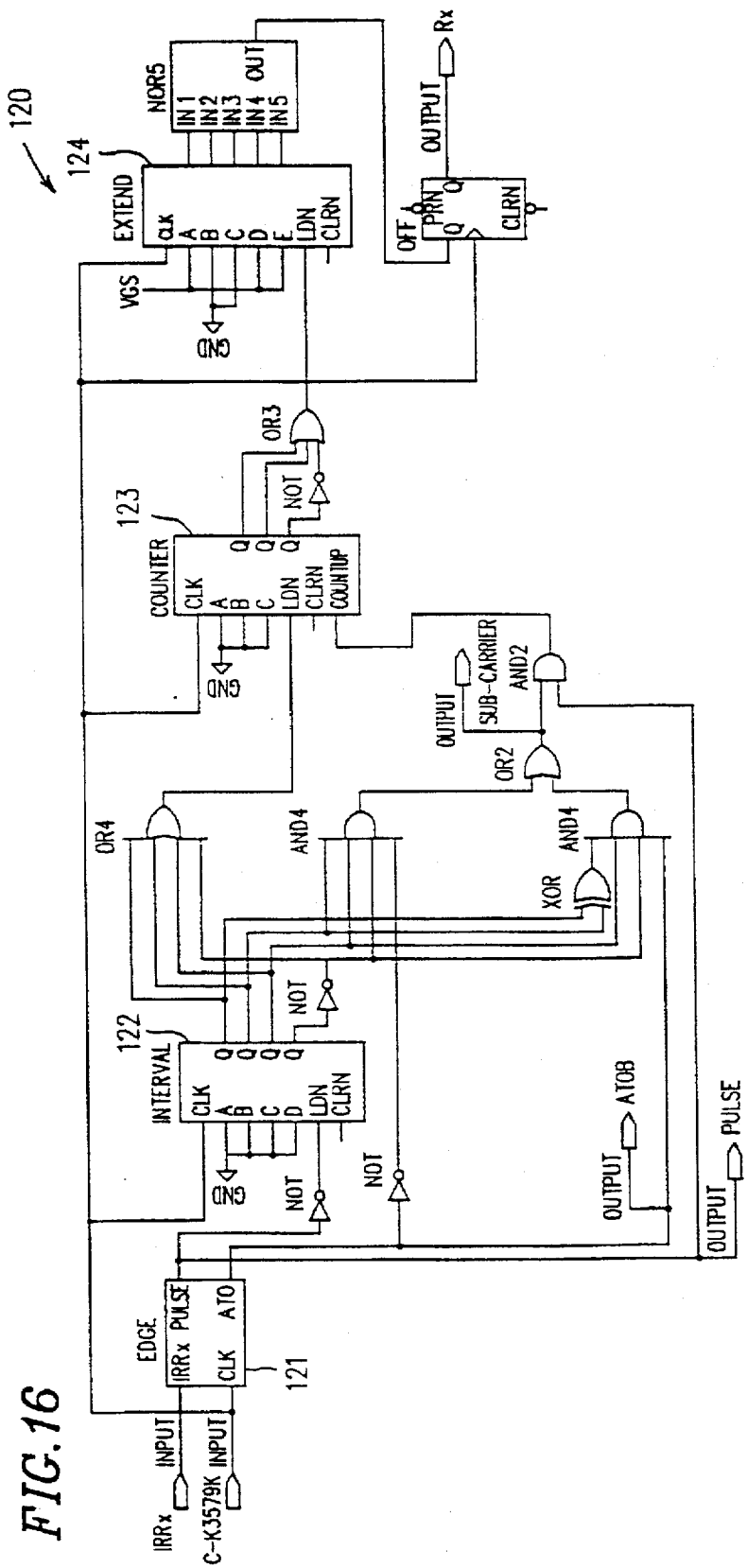
FIG. 16 is a diagram showing the circuitry of a digital section of a receiver in Example 3 according to the invention.

The construction of an analog section of a receiver in Example 3 is the same as that of the analog section 12 of the receiver in Example 1, so that the description thereof is omitted. FIG. 16 shows the circuitry of a digital section 120 in Example 3. The digital section 120 includes an edge detecting section 121 for detecting a falling edge of the input signal, an interval counter 122 for measuring a pulse interval of the output signal (IRRx), a pulse counter 123 for counting two pulses which are input at a predetermined interval, and a time extending circuit 124. The operation of the digital section 120 is illustrated in the timing diagram of FIG. 21.

Figure 17:
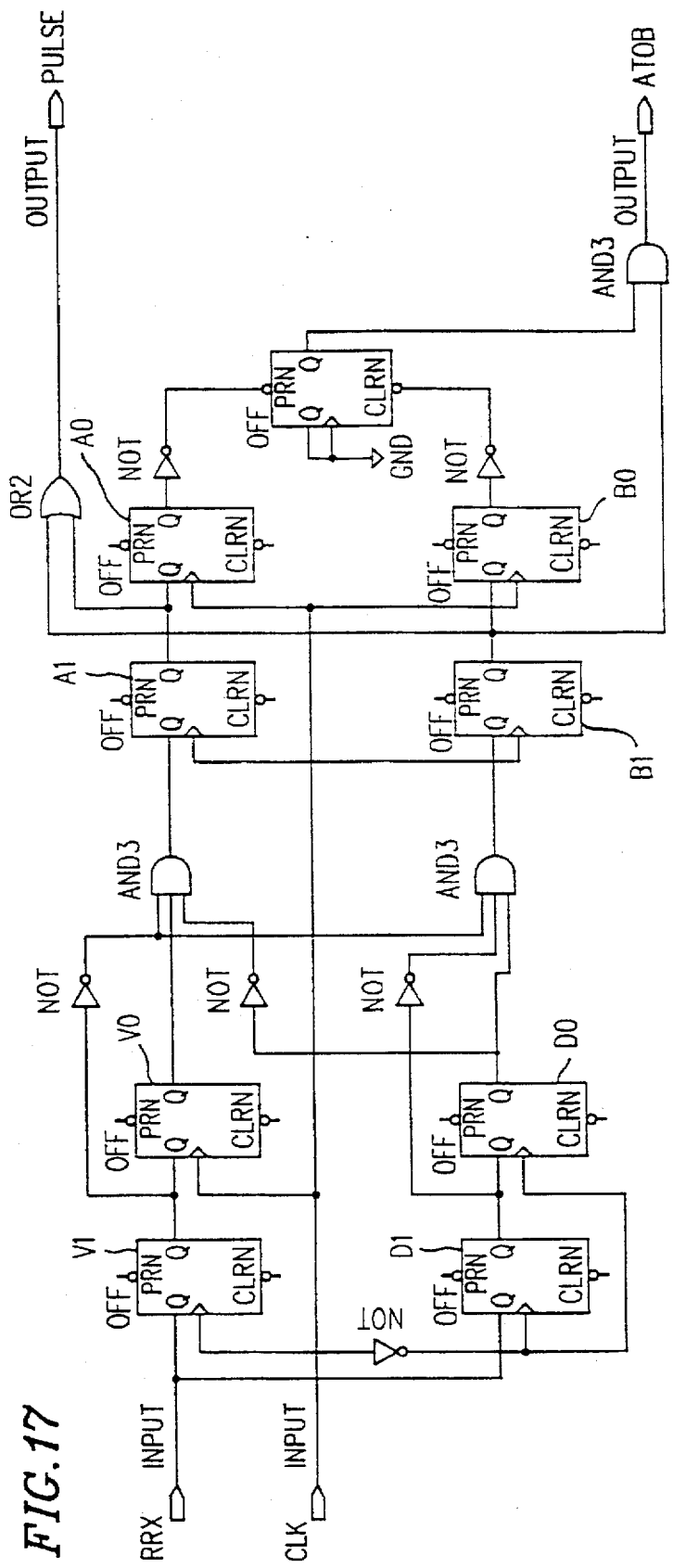
FIG. 17 is a diagram showing the circuitry of an edge detection circuit of the digital circuit section in Example 3.

FIG. 17 shows the circuitry of the edge detecting circuit 121. The edge detecting circuit 121 samples an input signal IRRx by using the rising edge and falling edge of a clock signal CLK. By using both rising and falling edges of the clock signal CLK, the sampling precision can be enhanced. If a pattern obtained by sampling the input signal IRRx is high-level, low-level, and low-level (H·L·L), the pattern is judged as the rising edge of the pulse, so that an output PULSE at a high level (H) is output. As a result, a pulse which has a shorter period than 139.7 ns in the input signal IRRx (½ of the sampling clock cycle) can be removed.

The falling edge pattern (H·L·L) of the input signal IRRx may be obtained when the clock signal CLK is at the high level (H), and when the clock signal CLK is at the low level (L). The former case is referred to as a pulse A, and the latter case is referred to as a pulse B. When the pulse A is first detected and then the pulse B is detected, the edge detecting circuit 121 outputs an output ATOB of high level.

Figure 18:
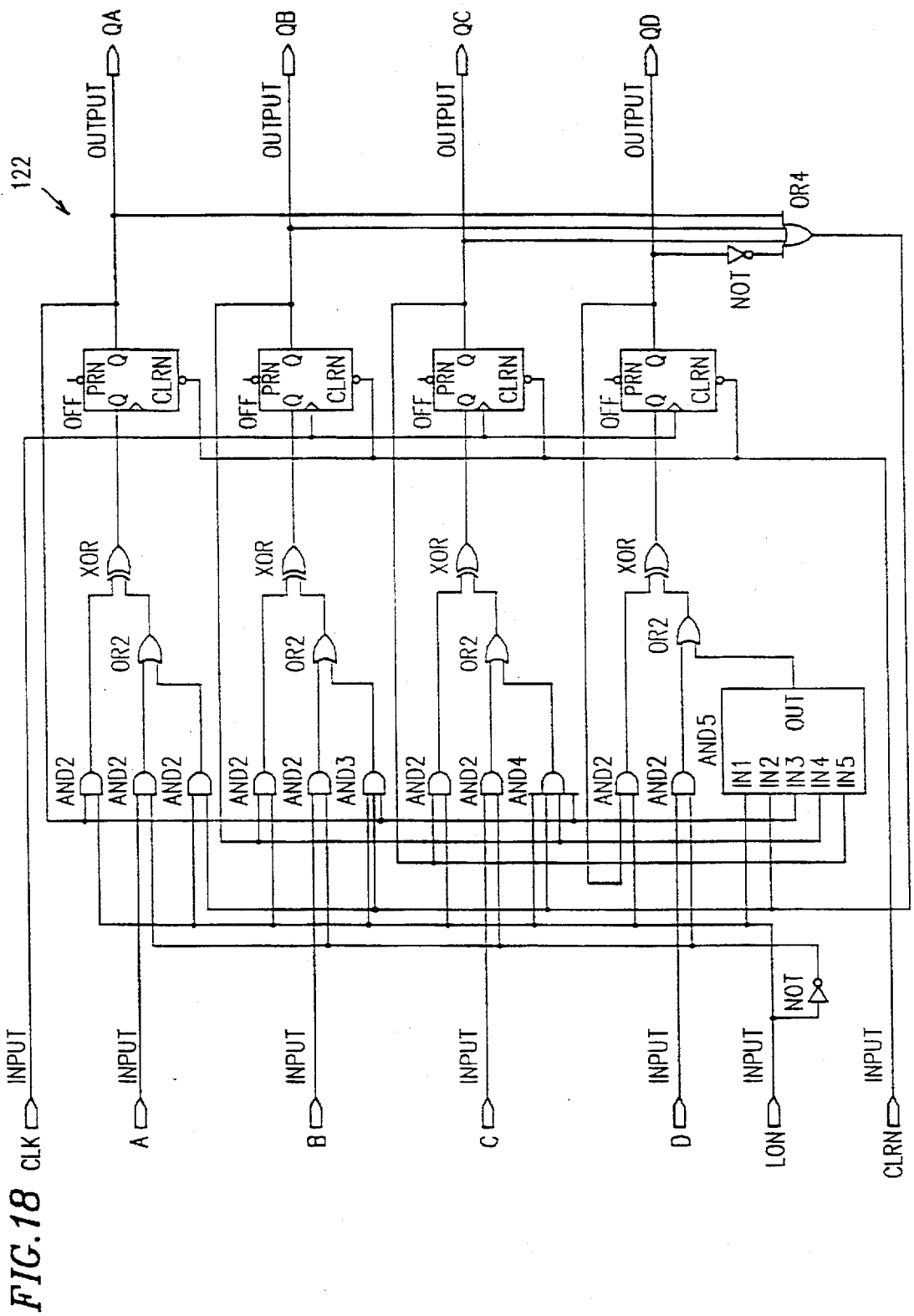
FIG. 18 is a diagram showing the circuitry of an interval counter of the digital circuit section in Example 3.

FIG. 18 shows the circuitry of the interval counter 122. The interval counter 122 is a 4-bit counter. Among the outputs QA, QB, QC, and QD, QA is the least significant bit, and QD is the most significant bit. The interval counter 122 counts up to 8, when the input LDN is at the low level. When the input LDN is at the high level, the inputs A, B, C, and D are loaded. As is seen from FIGS. 16 and 21, when the output PULSE of the edge detecting circuit 121 becomes high level, the interval counter 122 is set to 0.

Figure 19:
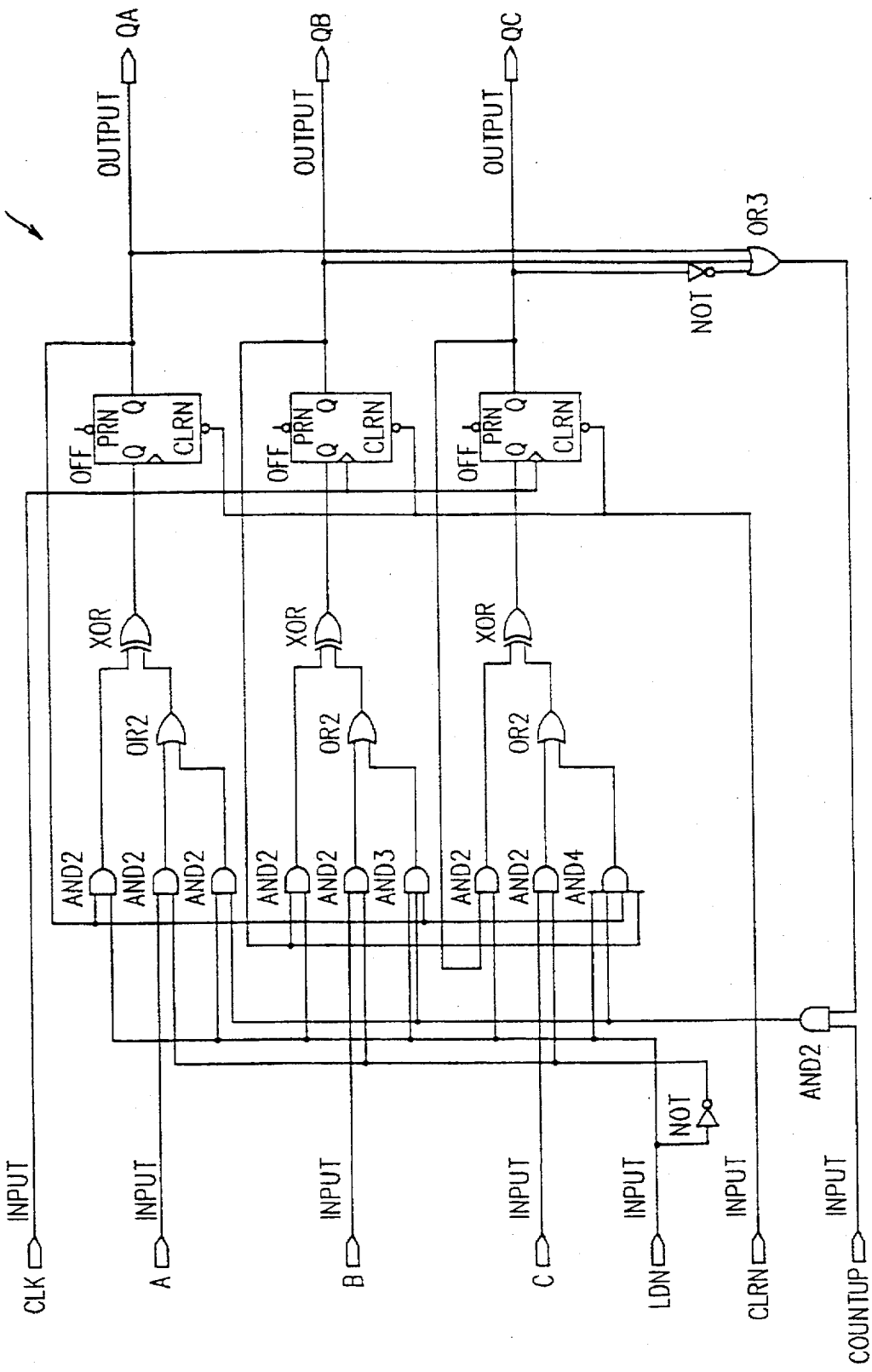
FIG. 19 is a diagram showing the circuitry of a pulse counter of the digital circuit section in Example 3.

FIG. 19 shows the circuitry of the pulse counter 123. The pulse counter 123 is a 3-bit counter. Among the outputs QA, QB, and QC, QA is the least significant bit, and QC is the most significant bit. The pulse counter 123 counts up to 4 when the input LDN is at the low level and the input COUNTUP is at high level. When the input LDN is at high level, the inputs A, B, and C are loaded. In the cases other than those described above, the value of the pulse counter 123 is not changed.

Figure 21:
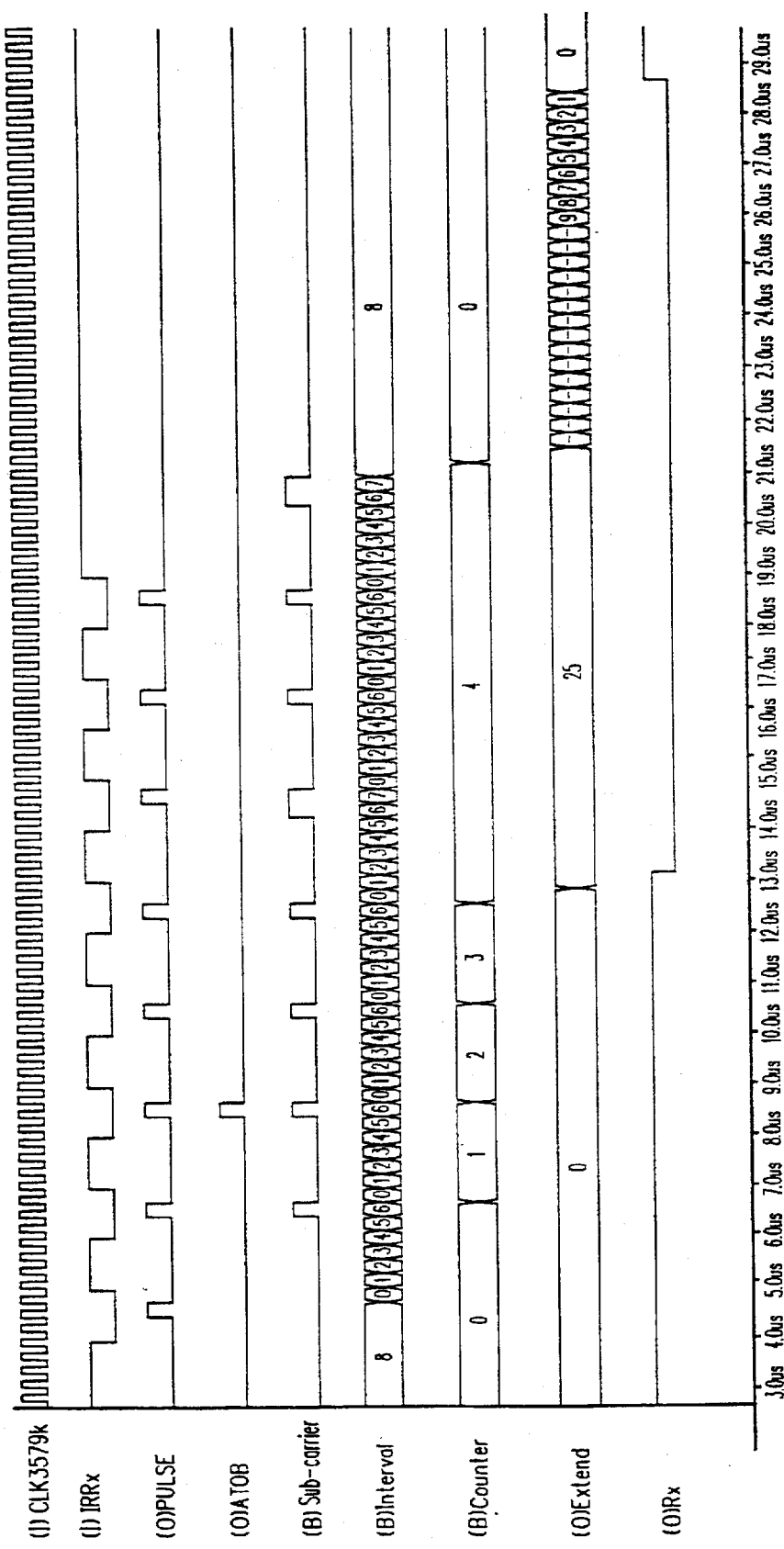
FIG. 21 is a timing diagram illustrating the operation of the digital circuit section in Example 3.

As is seen from FIGS. 16 and 21, when the output of the interval counter 122 becomes 0, the pulse counter 123 is set to 0.

The output SUB CARRIER becomes high, after 2 μs from the pulse detection. More specifically, as shown in FIGS. 16 and 21, the output SUB CARRIER becomes high in the cases where the detected two successive pulses are pulse A and pulse A and the value of the interval counter is 6 or 7, where the detected two successive pulses are pulse B and pulse A and the value of the interval counter is 6 or 7, where the detected two successive pulses are pulse B and pulse B and the value of the interval counter is 6 or 7, and where the detected two successive pulses are pulse A and pulse B, and the value of the interval counter is 5 or 6.

When both the outputs PULSE and SUB CARRIER of the edge detecting circuit 121 are at the high level, the pulse counter 123 counts up by one.

Figure 20:
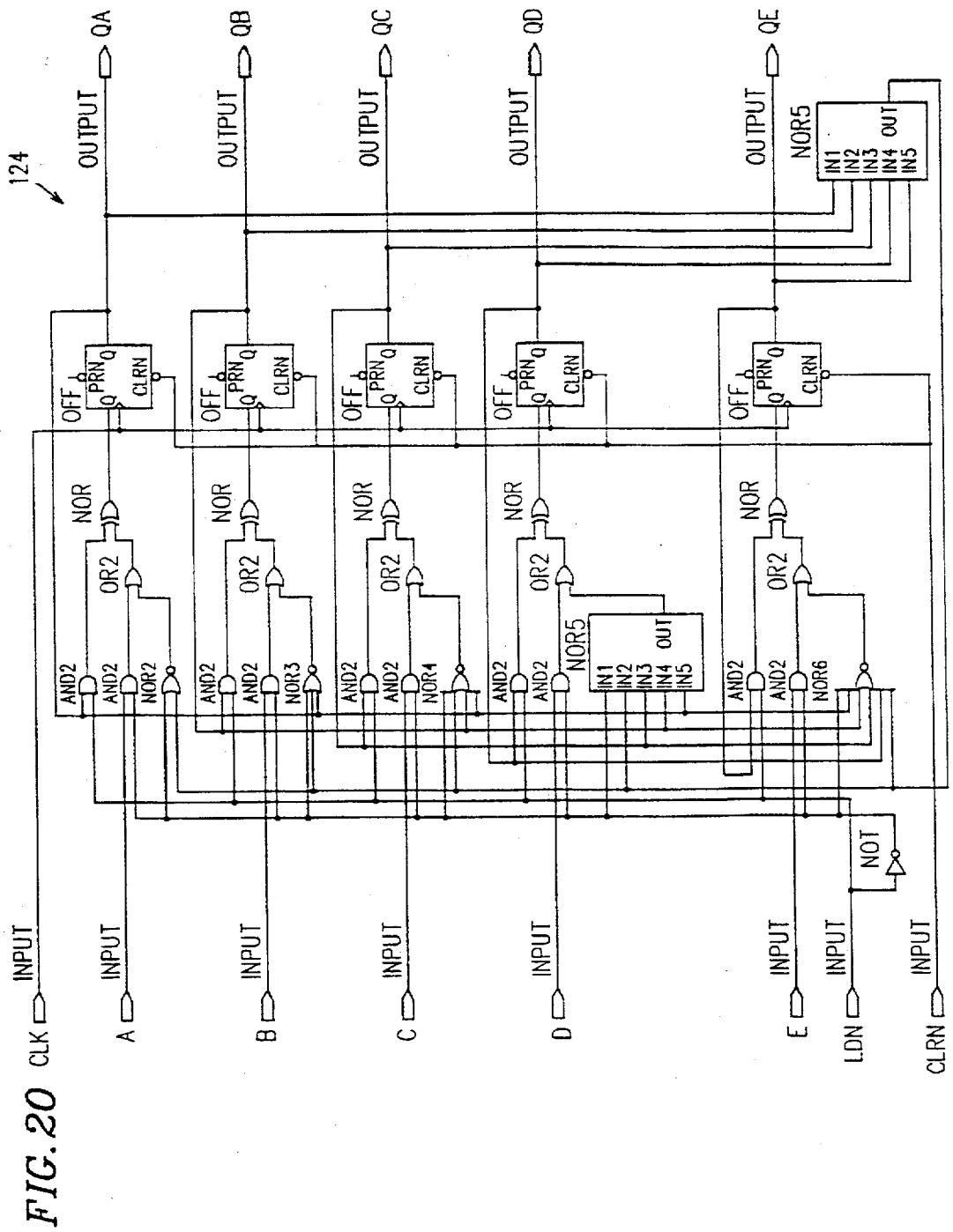
FIG. 20 is a diagram showing the circuitry of a time extending circuit of the digital circuit section in Example 3.

FIG. 20 shows the circuitry of the time extending circuit 124. The time extending circuit 124 is a 5-bit counter. Among the outputs QA, QB, QC, QD, and QE, QA is the least significant bit, and QE is the most significant bit. The time extending circuit 124 counts down to 0 when the input LDN is at the low level. When the input LDN is at the high level, the inputs A, B, C, D, and E are loaded. As is seen from FIGS. 16 and 21, when the output of the pulse counter 123 becomes 4, the time extending circuit 124 is set to 25.

When the output of the time extending circuit 124 is not 0, the output Rx of the digital section 120 becomes low.

EXAMPLE 4

The noise removing device according to the invention can be applied to a conventional receiver 300. That is, the receiver of the invention is compatible with the conventional receiver 300.

Figure 22:
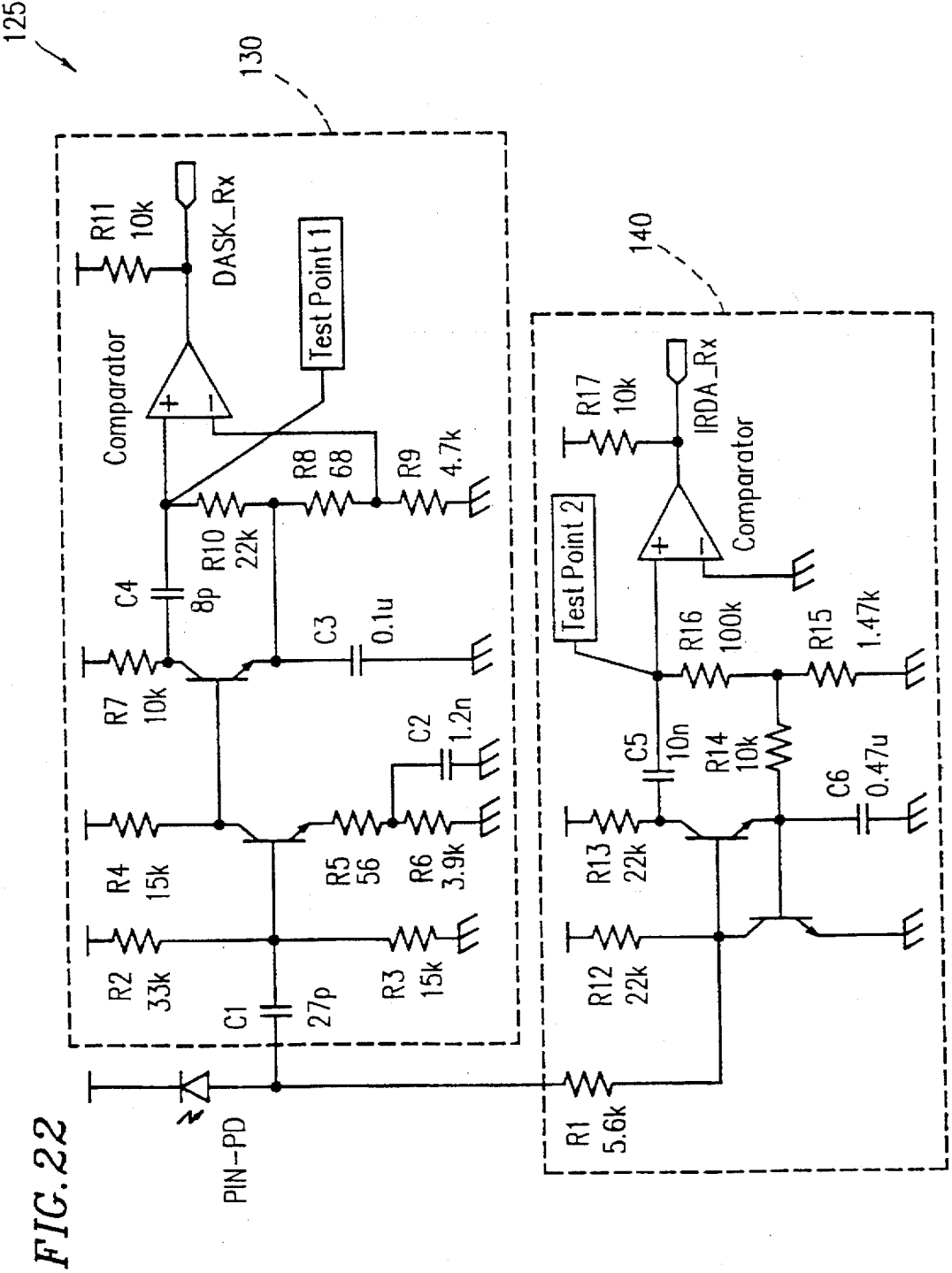
FIG. 22 is a diagram showing the circuitry of an analog section of a receiver in Example 4 according to the invention.

FIG. 22 shows an analog section 125 of a receiver in Example 4. The analog section 125 includes a first analog section 130 and a second analog section 140. The first analog section 130 corresponds to the above-described analog section of the present invention. The second analog section 140 corresponds to the analog circuit section 340 of the conventional receiver 300. The transmitted infrared signal is converted into an electric signal by a pin photodiode. The electric signal is supplied to the first and the second analog sections 130 and 140. The signal processing in each of the analog sections is the same as that described above. The outputs of the first and the second analog sections are applied to a first digital section and a second digital section, respectively. The first digital section corresponds to the digital section 12 (or 12') in the above examples. The second digital section corresponds to the digital circuit section 350 of the conventional receiver 300. The provision of two signal processing systems enables the data communication using the conventional method at high transmission rate in the environment with less noise, and the data communication using the noise removing device according to the invention in an environment with much noise.

Figure 23:
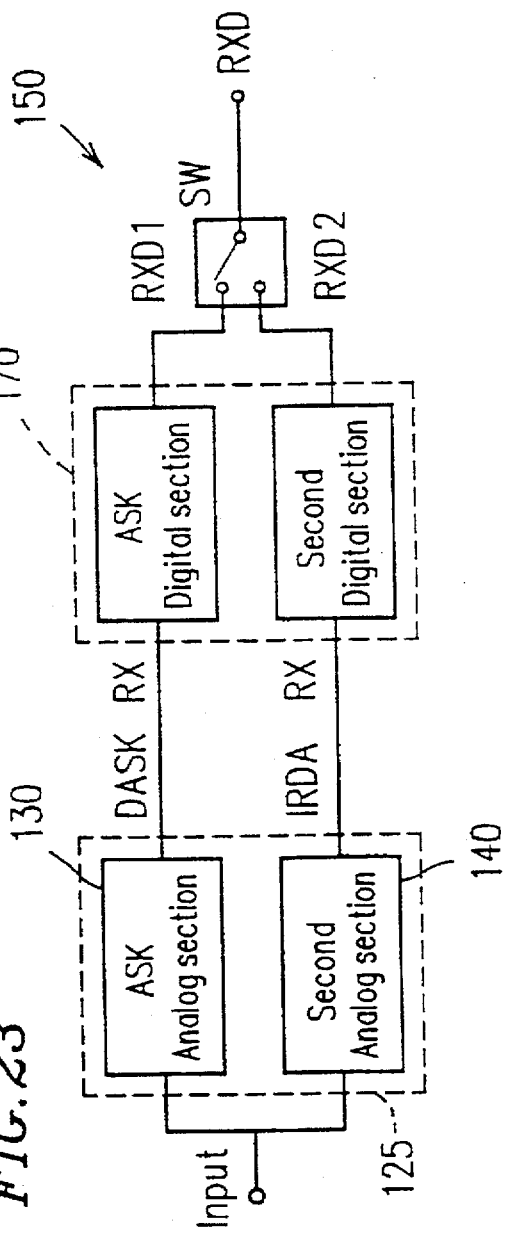
FIG. 23 is a diagram showing an exemplary receiver according to Example 4.

FIG. 23 shows a receiver 150 according to this example. The receiver 150 includes an analog section 125, a digital section 170, and an output switching circuit SW. The digital section 170 has a first digital section and a second digital section (e.g., the digital section 12 and the digital circuit section 350). The output switching circuit SW selectively outputs one of the outputs of the first and second digital sections depending on whether the received signal is a carrier signal or a signal which is transmitted in a base-band transmission method for the conventional receiver. Accordingly, the received signal can be correctly demodulated irrespective of the transmission method, and the data communication which makes effective use of the advantage of the environment in which the apparatus is used can be performed.

Figure 24:
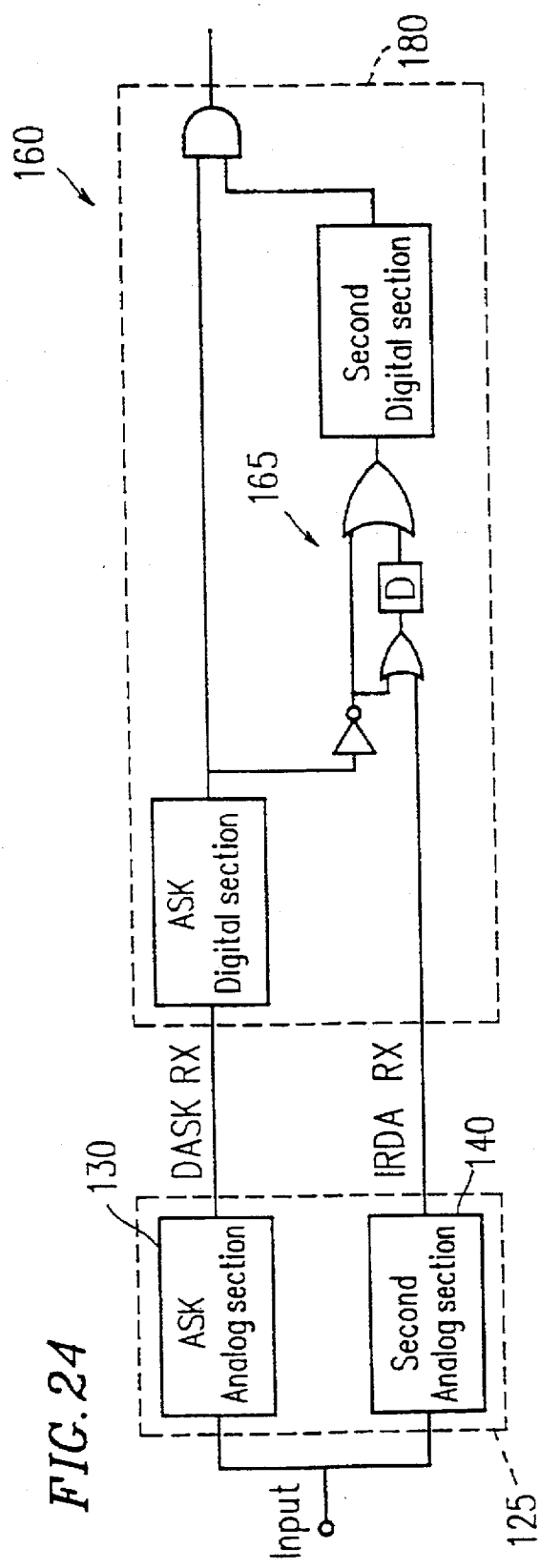
FIG. 24 is a diagram showing another exemplary receiver according to Example 4.

FIG. 24 shows another exemplary receiver 160 according to this example. The receiver 160 includes the analog section 125 and a digital section 180. The digital section 180 includes a first (ASK) digital section and a second digital section (e.g., the digital section 12 and the digital circuit section 350). The digital section 180 further includes an input suppressing circuit 165 and an output section (AND gate).

When the analog section 125 receives an ASK carrier, the signal DASK Rx output from the first analog section 130 is correctly amplified and high-pass filtered. However, the signal IRDA Rx output from the second analog section 140 is indefinite. Similarly, when the analog section 125 receives a signal transmitted by the base-band transmission method for the conventional receiver 300, the signal DASK Rx output from the first analog section 130 is indefinite. Therefore, when the ASK carrier is received (i.e., when the first digital section judges that the ASK carrier is detected), the output of the second analog section 140 is suppressed. When a signal other than the ASK carrier is received, the output of the second analog section 140 is effectively used. In this way, the received signal can be correctly demodulated.

The input suppressing circuit 165 can be constructed, for example, by a NOT Gate, two OR gates, and a delay circuit D, as shown in FIG. 24. The delay circuit D delays the output IRDA Rx of the analog circuit 140 by a time required for the first digital section to judge the ASK carrier. When the output DASK of the first digital section is at the low level, the signal IRDA Rx is suppressed in the input and output portions of the delay circuit D.

According to the receiver of this example, it is possible to remove the noises and also to attain the high transmission rate which is inherent to the conventional modulation scheme.

The number of transistors employed in the receiver of this invention is about ten. If the comparator is excluded, two transistors can be sufficient. Therefore, according to the invention, the circuit scale of the receiver can be remarkably reduced as compared with the conventional receiver. Also, the size of the receiver 10 can be remarkably reduced.

In addition to the wireless communication as described above, the present invention can also be applied to wired communication such as factory automation. For example, in the production line of automobiles, communication network lines are used over a long distance in the environment in which welding robots work. In such an environment, due to the antenna function of the communication lines, low-frequency noises, and pulse noises generated by the welding robots may be mixed into the communication lines. In order to remove such various noises, the invention can be suitably and effectively used.

The present invention can attain the following effects.
(1) In the analog signal processing circuit, a high-pass filter is used instead of a band-pass filter, so that it is possible to decrease the circuit scale of the analog signal processing circuit. As a result, the mounting area of the analog signal processing circuit is reduced, and the production cost can be reduced. In addition, as the circuit scale is decreased, the circuit characteristics become stable. Thus, mass production can be easily performed.
(2) By using the ASK method for the modulation, the digital signal processing circuit can be implemented by using a small-scale digital circuit or a small-scale digital signal processing software.
(3) According to the invention, both the noise removing processing and the demodulation processing are performed in the digital signal processing. Thus, the change of modulation methods can be accommodated only by changing the digital signal processing circuit.
(4) By providing the noise removing device of the invention in a receiver used in infrared data communication, it is possible to realize a receiver which can perform communication even in an environment with a lot of noises generated from a fluorescent lamp or the like.
(5) If the modulated signal is a digital signal, the A/D converter can be realized as a comparator. In such a case, the digital signal processing circuit only processes serial data. Therefore, the analog signal processing circuit and the digital signal processing circuit are both simplified.
(6) According to the receiver of this invention, a modulation scheme in which the immunity against noises is low but the data transmission rate is high can be selected in the environment with less noise, and a modulation scheme in which the data transmission rate is low but the immunity against noises is high can be selected in the environment with a lot of noises.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A noise removing device in a data communication system which uses a transmitting signal modulated by a data signal to be transmitted, the noise removing device comprising:

receiving means for receiving the transmitting signal, and converting it into an electric signal, so as to supply an input signal;

analog signal processing means for selectively passing the input signal in a first frequency range including a carrier frequency of the transmitting signal, thereby removing a first noise, for converting the passed signal into a digital signal, and for outputting the digital signal; and digital signal processing means for sampling he digital signal, and for selectively passing the digital signal in a second frequency range including the carrier frequency based on a result of comparison of a pattern obtained by the sampling with a predetermined pattern, thereby removing a second noise.

2. A noise removing device according to claim 1, wherein the analog signal processing means includes first filter means for selectively passing the input signal in the first frequency range and analog/digital converting means for converting the input signal passed through the first filter means into a digital signal, so as to output it, and wherein the digital signal processing means includes sampling means for sampling the digital signal output from the analog/digital converting means, comparing means for comparing the sampling pattern obtained by the sampling with the predetermined pattern, and second filter means for selectively passing the digital signal in the second frequency range based on the comparison result.

3. A noise removing device according to claim 2, wherein the digital signal processing means includes edge detecting means for detecting an edge of the digital signal output from the analog/digital converting means and for generating a detection signal, and wherein the sampling means performs the sampling based on the detection signal.

4. A noise removing device according to claim 1, wherein the first frequency range excludes a frequency range lower than a predetermined frequency, and the second frequency range excludes a frequency range higher than another predetermined frequency.

5. A noise removing device according to claim 4, wherein the data signal to be transmitted is a digital signal, the transmitting signal is a signal obtained by modulating the carrier by an ASK method, and the data communication system is a wireless communication system using an infrared ray.

6. A noise removing device according to claim 1, wherein the predetermined pattern is a waveform pattern of the carrier.

7. A noise removing device according to claim 1, wherein the data signal to be transmitted is a digital signal.

8. A noise removing device according to claim 1, wherein the transmitting signal is a signal obtained by modulating the carrier by an ASK method.

9. A noise removing device according to claim 1, wherein the data communication system is a wireless communication system.

10. A noise removing device according to claim 9, wherein a communication media of the data communication system is an infrared ray.

11. A receiver in a data communication system which uses a transmitting signal modulated by a data signal to be transmitted, the receiver comprising:

receiving means for receiving the transmitting signal, and converting it into an electric signal, so as to supply an input signal;

analog signal processing means for selectively passing the input signal of a first frequency range including a carrier frequency of the transmitting signal, thereby removing a first noise, for converting the passed signal into a digital signal, and for outputting the digital signal;

digital signal processing means for sampling the digital signal, and for selectively passing the digital signal in a second frequency range including the carrier frequency based on a result of comparison of a pattern obtained by the sampling with a predetermined pattern, thereby removing a second noise; and means for demodulating the data signal from the output signal of the digital signal processing means.

12. A receiver according to claim 11, wherein the analog signal processing means includes first filter means for selectively passing the input signal in the first frequency range and analog/digital converting means for converting the input signal passed through the first filter means into a digital signal, so as to output it, and wherein the digital signal processing means includes sampling means for sampling the digital signal output from the analog/digital converting means, comparing means for comparing the sampling pattern obtained by the sampling with the predetermined pattern, and second filter means for selectively passing the digital signal in the second frequency range based on the comparison result.

13. A receiver according to claim 12, wherein the digital signal processing means includes edge detecting means for detecting an edge of the digital signal output from the analog/digital converting means and for generating a detection signal, and wherein the sampling means performs the sampling based on the detection signal.

14. A receiver according to claim 11, wherein the first frequency range excludes a frequency range lower than a predetermined frequency, and the second frequency range excludes a frequency range higher than another predetermined frequency.

15. A receiver according to claim 14, wherein the data signal to be transmitted is a digital signal, the transmitting signal is a signal obtained by modulating the carrier by an ASK method, and the data communication system is a wireless communication system using an infrared ray.

16. A receiver according to claim 11, wherein the predetermined pattern is a waveform pattern of the carrier.

17. A receiver according to claim 11, wherein the data signal to be transmitted is a digital signal.

18. A receiver according to claim 11, wherein the transmitting signal is a signal obtained by modulating the carrier by an ASK method.

19. A receiver according to claim 11, wherein the data communication system is a wireless communication system.

20. A receiver according to claim 19, wherein a communication media of the data communication system is an infrared ray.

21. A receiver according to claim 11, further comprising second analog signal processing means for, when the transmitting signal is a signal which is transmitted by a base-band transmission method, receiving the input signal and for amplifying the output signal so as to output a second digital signal, and second digital signal processing means for receiving the second digital signal and for decoding the second digital signal, thereby demodulating the transmitted signal.

22. A receiver according to claim 21, further comprising means for selectively outputting one of the output of the demodulating means and the output of the second digital signal processing means, based on whether the transmitted signal is a carrier signal modulated by the data signal or a base-band transmission signal of the data signal.

23. A receiver according to claim 21, further comprising means for selectively inputting the second digital signal into the second digital signal processing means by controlling the second digital signal output from the second analog signal processing means in accordance with the output signal of the first digital signal processing means.

24. A receiver according to claim 23, wherein the selectively inputting means suppresses the input of the second digital signal into the second digital signal processing means, when the input signal is a carrier signal modulated by the data signal.

25. A receiver according to claim 21, wherein the analog signal processing means includes first filter means for selectively passing the input signal in the first frequency range and analog/digital converting means for converting the input signal passed through the first filter means into a digital signal, so as to output it, and wherein the digital signal processing means includes sampling means for sampling the digital signal output from the analog/digital converting means, comparing means for comparing the sampling pattern obtained by the sampling with the predetermined pattern, and second filter means for selectively passing the digital signal in the second frequency range based on the comparison result.

26. A receiver according to claim 25, wherein the digital signal processing means includes edge detecting means for detecting an edge of the digital signal output from the analog/digital converting means and for generating a detection signal, and wherein the sampling means performs the sampling based on the detection signal.

27. A receiver according to claim 21, wherein the first frequency range excludes a frequency range lower than a predetermined frequency, and the second frequency range excludes a frequency range higher than another predetermined frequency.

28. A receiver according to claim 27, wherein the data signal to be transmitted is a digital signal, the transmitting signal is a signal obtained by modulating the carrier by an ASK method, and the data communication system is a wireless communication system using an infrared ray.

29. A receiver according to claim 21, wherein the predetermined pattern is a waveform pattern of the carrier.

30. A receiver according to claim 21, wherein the data signal to be transmitted is a digital signal.

31. A receiver according to claim 21, wherein the transmitting signal is a signal obtained by modulating the carrier by an ASK method.

32. A receiver according to claim 21, wherein the data communication system is a wireless communication system.

33. A receiver according to claim 32, wherein a communication media of the data communication system is an infrared ray.

34. A noise removing method in a data communication system which uses a transmitting signal modulated by a data signal to be transmitted, the noise removing method comprising:

receiving the transmitting signal, and converting it into an electric signal, so as to generate an input signal;

selectively passing said input signal in a first frequency range including a carrier frequency of the transmitting signal by processing the input signal through an analog signal processing, thereby removing a first noise;

converting the input signal to a digital input signal; and selectively passing the digital input signal in a second frequency range including the carrier frequency based on a result of comparison of a pattern obtained by sampling the digital input signal with a predetermined pattern, thereby removing a second noise.

35. A noise removing method in a data communication system which uses a transmitting signal modulated by a data signal to be transmitted, the noise removing method comprising the steps of:

receiving the transmitting signal, and converting it into an electric signal, so as to generate an input signal;

selectively passing the input signal in a first frequency range including a carrier frequency of the transmitting signal by processing the input signal through an analog signal processing, thereby removing a first noise;

converting the input signal which is selectively passed into a digital signal;

sampling the digital signal;

comparing the pattern obtained by the sampling with a predetermined pattern; and selectively passing the digital signal in a second frequency range including the carrier frequency based on the comparison result, thereby removing a second noise.

36. A noise removing method according to claim 35, further comprising a step of generating a detection signal by detecting an edge of the digital signal, wherein in the sampling step, the digital signal is sampled based on the detection signal.

37. A noise removing method according to claim 35, wherein the first frequency range excludes a frequency range lower than a predetermined frequency, and the second frequency range excludes a frequency range higher than another predetermined frequency.

38. A noise removing method according to claim 37, wherein the data signal to be transmitted is a digital signal, the transmitting signal is a signal obtained by modulating the carrier by an ASK method, and the data communication system is a wireless communication system using an infrared ray.

39. A noise removing method according to claim 35, wherein in the comparing step, the pattern obtained by the sampling is compared with a waveform pattern of the carrier.

40. A noise removing method according to claim 35, wherein the data signal to be transmitted is a digital signal.

41. A noise removing method according to claim 35, wherein the transmitting signal is a signal obtained by modulating the carrier by an ASK method.

42. A noise removing method according to claim 35, wherein the data communication system is a wireless communication system.

43. A noise removing method according to claim 42, wherein a communication media of the data communication system is an infrared ray.

44. A receiving method in a data communication system which uses a transmitting signal modulated by a data signal to be transmitted, the receiving method comprising the steps of:

receiving the transmitting signal, and converting it into an electric signal, so as to generate an input signal;

selectively passing the input signal in a first frequency range including a carrier frequency of the transmitting signal, thereby removing a first noise;

converting the input signal which is selectively passed into a digital signal;

sampling the digital signal;

comparing a pattern obtained by the sampling with a predetermined pattern;

selectively passing the digital signal in a second frequency range including the carrier frequency based on the comparison result, thereby removing a second noise; and demodulating the digital signal from which the first and second noises are removed so as to obtain the data signal.

45. A receiving method according to claim 44, further comprising the steps of:

when the transmitting signal is a signal which is transmitted by a base-band transmission method, amplifying the input signal through an analog signal processing, thereby generating a second digital signal; and decoding the second digital signal through a digital signal processing, thereby demodulating the transmitting signal.

46. A receiving method according to claim 45, further comprising a step of selecting one of the signal from which the first and second noises are removed and the signal obtained by decoding the second digital signal, based on whether the transmitted signal is a carrier signal modulated by the data signal or a base-band transmission signal of the data signal.

47. A receiving method according to claim 45, further comprising a step of suppressing the step of decoding the second digital signal in accordance with a value of the data signal demodulated in the demodulating step.

48. A receiving method according to claim 47, wherein, in the suppressing step, the step of decoding the second digital signal is suppressed when the transmitted signal is a carrier signal modulated by the data signal.

49. A receiving method according to claim 45, further comprising a step of selecting one of the step of removing the first noise and the step of generating the second digital signal, based on whether the transmitted signal is a carrier signal modulated by the data signal or a base-band transmission signal of the data signal.

* * * * *